US012764837B2

(12) United States Patent
Zhang et al.

(10) Patent No.: US 12,764,837 B2
(45) Date of Patent: Oct. 13, 2026

(54) COMBINATION MICROWAVE AND HOOD SYSTEM

(71) Applicant: WHIRLPOOL CORPORATION, Benton Harbor, MI (US)

(72) Inventors: Owen (XunCai) Zhang, Shenzhen (CN); Michael A. Ledford, St. Joseph, MI (US); Stephen Zheng, Shenzhen (CN); Xiangxu Liu, Shenzhen (CN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 19/066,773

(22) Filed: Feb. 28, 2025

(65) Prior Publication Data

US 2025/0203724 A1 Jun. 19, 2025

Related U.S. Application Data

(63) Continuation of application No. 18/886,749, filed on Sep. 16, 2024, now Pat. No. 12,289,819, which is a
(Continued)

(51) Int. Cl.
*H05B 6/64* (2006.01)
*F24C 15/20* (2006.01)

(52) U.S. Cl.
CPC ....... *H05B 6/6423* (2013.01); *F24C 15/2042* (2013.01); *H05B 6/6402* (2013.01); *H05B 6/6426* (2013.01); *H05B 2206/042* (2013.01)

(58) Field of Classification Search
CPC ................ H05B 6/6423; H05B 6/6402; H05B 6/6426; H05B 2206/042; F24C 15/2042
(Continued)

(56) References Cited

U.S. PATENT DOCUMENTS 3,089,479 A 5/1963 Perl
3,131,688 A 5/1964 Lipstein
(Continued)

FOREIGN PATENT DOCUMENTS

CA 2311570 A1 12/2000
CN 1118666 C 8/2003
(Continued)

OTHER PUBLICATIONS

Machine Translation of KR20110018224A (Year: 2025).*
Machine Translation of KR20110019838A (Year: 2025).*
Bosch HMV9305 Installation Instructions (Year Unknown).
Bosch HMV9305 Manual (Year Unknown).
Frigidaire FGMV174KFC Installation Instructions (2011).
Frigidaire FGMV174KFC Manual (2010).
(Continued)

*Primary Examiner* — John J Norton
*Assistant Examiner* — Thomas J Ward
(74) *Attorney, Agent, or Firm* — Price Heneveld LLP

(57) ABSTRACT

A microwave hood system is provided. The microwave hood system includes a microwave oven enclosure defining a cooking cavity therein. A cooking component is positioned within the cooking cavity and configured to emit microwaves. The heating system defines a heating cavity therein, wherein the heating system is coupled to the microwave oven enclosure. A heating element is positioned in the heating cavity. The heating cavity reaches a temperature in a range from about 40° C. to about 80° C. when the heating element is in use. A broiler element is positioned within the heating cavity. The heating cavity reaches a temperature in a range from about hundred and 150° C. to about 300° C. when the broiler element is in use. A dual hood system is also coupled to the microwave hood system.

31 Claims, 31 Drawing Sheets

Related U.S. Application Data continuation of application No. 18/312,925, filed on May 5, 2023, which is a continuation of application No. 18/073,694, filed on Dec. 2, 2022, now Pat. No. 12,133,317, which is a continuation of application No. 16/265,432, filed on Feb. 1, 2019, now Pat. No. 11,523,473, which is a continuation-in-part of application No. 16/090,440, filed as application No. PCT/CN2017/080048 on Apr. 11, 2017, now Pat. No. 11,079,118.

(60) Provisional application No. 62/321,283, filed on Apr. 12, 2016.

(58) Field of Classification Search
USPC .......................................................... 219/757
See application file for complete search history.

(56) References Cited

U.S. PATENT DOCUMENTS

| | | | | |
|---|---|---|---|---|
| 3,514,577 | A | 5/1970 | Dills et al. | |
| 3,598,962 | A | 8/1971 | Badnaruk et al. | |
| 3,654,417 | A | 4/1972 | Javes et al. | |
| 3,719,137 | A | 3/1973 | Gould | |
| 3,818,171 | A | 6/1974 | Miller et al. | |
| 4,143,646 | A | 3/1979 | Sampsel | |
| 4,184,945 | A | 1/1980 | Kullman et al. | |
| 4,313,043 | A | 1/1982 | White et al. | |
| 4,327,274 | A | 4/1982 | White et al. | |
| 4,354,084 | A | 10/1982 | Husslein et al. | |
| 4,418,261 | A | 11/1983 | Jailor et al. | |
| 4,720,622 | A | 1/1988 | Iwata et al. | |
| 4,743,728 | A | 5/1988 | Nagafusa et al. | |
| 4,786,774 | A | 11/1988 | Ikuyasu | |
| 4,886,046 | A | 12/1989 | Welch | |
| 5,155,318 | A | 10/1992 | Bowen | |
| 5,272,302 | A | 12/1993 | Dudley et al. | |
| 5,674,425 | A | 10/1997 | Hong | |
| 5,690,848 | A | 11/1997 | Lamberti | |
| 5,771,786 | A | 6/1998 | Chung | |
| 5,951,907 | A | 9/1999 | Kang | |
| 5,981,929 | A | 11/1999 | Maeda et al. | |
| 6,018,158 | A | 1/2000 | Kang | |
| 6,218,653 | B1 | 4/2001 | Kang | |
| 6,239,419 | B1 | 5/2001 | Kim | |
| 6,539,840 | B2 | 4/2003 | Choi et al. | |
| 6,653,610 | B2 | 11/2003 | Ahn | |
| 6,670,594 | B1 | 12/2003 | Jeong et al. | |
| 6,696,676 | B1 | 2/2004 | Graves et al. | |
| 6,768,090 | B2 | 7/2004 | Kang | |
| 6,772,678 | B2 | 8/2004 | Choi et al. | |
| 6,797,930 | B2 | 9/2004 | Kim | |
| 6,812,444 | B2 | 11/2004 | Ahn | |
| 6,864,472 | B2 | 3/2005 | Kang | |
| 6,867,399 | B2 | 3/2005 | Muegge et al. | |
| 6,930,295 | B2 | 8/2005 | Kim | |
| 6,965,101 | B2 | 11/2005 | Kim et al. | |
| 7,019,272 | B2 | 3/2006 | Braunisch et al. | |
| 7,041,949 | B2 | 5/2006 | Kim | |
| 7,087,875 | B2 * | 8/2006 | Cho | H05B 6/6429 219/757 |
| 7,173,226 | B2 | 2/2007 | Kang | |
| 7,193,195 | B2 | 3/2007 | Lundstrom et al. | |
| 7,317,178 | B2 | 1/2008 | Cho et al. | |
| 7,358,468 | B2 | 4/2008 | Kang | |
| 7,482,562 | B2 | 1/2009 | Song et al. | |
| 7,863,549 | B2 | 1/2011 | Song et al. | |
| 8,074,637 | B2 * | 12/2011 | Yamauchi | F24F 7/065 126/299 R |
| 8,698,057 | B2 | 4/2014 | Park et al. | |
| 9,010,313 | B2 | 4/2015 | Mikulec | |
| 9,476,597 | B1 | 10/2016 | Howerton | |
| 10,149,352 | B2 | 12/2018 | Huang et al. | |
| 11,067,291 | B2 | 7/2021 | Kweon et al. | |
| 11,979,967 | B2 | 5/2024 | Zhang et al. | |
| 2002/0084267 | A1 | 7/2002 | Kim | |
| 2003/0024925 | A1 | 2/2003 | Graves et al. | |
| 2003/0230571 | A1 | 12/2003 | Jeong et al. | |
| 2004/0050841 | A1 | 3/2004 | Han et al. | |
| 2004/0134908 | A1 | 7/2004 | Jeong | |
| 2004/0144774 | A1 | 7/2004 | Kim | |
| 2005/0092746 | A1 | 5/2005 | Song et al. | |
| 2006/0027574 | A1 | 2/2006 | Cho | |
| 2006/0081623 | A1 | 4/2006 | Cho | |
| 2007/0095822 | A1 | 5/2007 | Wiseman et al. | |
| 2007/0194015 | A1 | 8/2007 | Kim | |
| 2008/0156792 | A1 | 7/2008 | Song et al. | |
| 2008/0156796 | A1 | 7/2008 | Song et al. | |
| 2009/0134155 | A1 | 5/2009 | Kim et al. | |
| 2010/0089910 | A1 * | 4/2010 | Park | H05B 6/6423 219/757 |
| 2010/0187225 | A1 | 7/2010 | Park | |
| 2011/0000477 | A1 | 1/2011 | Kwon et al. | |
| 2012/0152227 | A1 | 6/2012 | Oagley et al. | |
| 2013/0134156 | A1 | 5/2013 | Yu et al. | |
| 2013/0156906 | A1 | 6/2013 | Raghavan et al. | |
| 2014/0042156 | A1 | 2/2014 | Kim et al. | |
| 2014/0318389 | A1 | 10/2014 | Kim | |
| 2015/0020404 | A1 | 1/2015 | Kim | |
| 2015/0053674 | A1 | 2/2015 | Liu et al. | |
| 2015/0069049 | A1 | 3/2015 | Armstrong et al. | |
| 2015/0192306 | A1 | 7/2015 | Armstrong | |
| 2015/0302569 | A1 | 10/2015 | Armstrong et al. | |
| 2015/0305095 | A1 * | 10/2015 | Huang | H05B 6/6423 219/757 |
| 2015/0359046 | A1 | 12/2015 | Mohseni | |
| 2015/0373789 | A1 | 12/2015 | Meusburger et al. | |
| 2016/0119982 | A1 | 4/2016 | Kang et al. | |
| 2016/0165672 | A1 | 6/2016 | Imm et al. | |
| 2016/0165674 | A1 | 6/2016 | Imm et al. | |
| 2016/0165675 | A1 | 6/2016 | Imm et al. | |
| 2016/0381741 | A1 | 12/2016 | Lee et al. | |
| 2017/0150554 | A1 | 5/2017 | Shoup et al. | |
| 2018/0220498 | A1 | 8/2018 | Jeon et al. | |
| 2018/0352615 | A1 | 12/2018 | Lim et al. | |

FOREIGN PATENT DOCUMENTS

| | | | |
|---|---|---|---|
| CN | 1459589 | A | 12/2003 |
| CN | 100513881 | C | 7/2009 |
| CN | 101672489 | A | 3/2010 |
| CN | 101737818 | A | 6/2010 |
| CN | 101737832 | A | 6/2010 |
| CN | 101672489 | B | 11/2012 |
| CN | 203837048 | U | 9/2014 |
| CN | 204153828 | U | 2/2015 |
| CN | 204153829 | U | 2/2015 |
| CN | 104676669 | A | 6/2015 |
| CN | 205447882 | U | 8/2016 |
| DE | 4143124 | A1 | 7/1992 |
| DE | 102012222784 | A1 | 6/2013 |
| EP | 0965797 | B1 | 6/2003 |
| EP | 1530406 | A1 | 5/2005 |
| EP | 2857759 | B1 | 10/2018 |
| GB | 2028491 | A | 3/1980 |
| KR | 19960038267 | A | 11/1996 |
| KR | 1020000008035 | A | 2/2000 |
| KR | 1020000009829 | A | 2/2000 |
| KR | 200183687 | Y1 | 3/2000 |
| KR | 100265644 | B1 | 6/2000 |
| KR | 100284548 | B1 | 12/2000 |
| KR | 1020010064851 | A | 7/2001 |
| KR | 200243724 | Y1 | 8/2001 |
| KR | 200256430 | Y1 | 11/2001 |
| KR | 1020040008853 | A | 1/2004 |
| KR | 1020040061126 | A | 7/2004 |
| KR | 1020040068681 | A | 8/2004 |
| KR | 1020040100039 | A | 12/2004 |
| KR | 1020050009555 | A | 1/2005 |
| KR | 100587348 | B1 | 5/2006 |
| KR | 20060125261 | A | 12/2006 |
| KR | 1020060125261 | A | 12/2006 |
| KR | 1020070034216 | A | 3/2007 |

(56) References Cited

FOREIGN PATENT DOCUMENTS

| | | | | | |
|---|---|---|---|---|---|
| KR | 100879778 | B1 | | 1/2009 | |
| KR | 1020090062008 | A | | 6/2009 | |
| KR | 1020090104244 | A | | 10/2009 | |
| KR | 1020090124346 | A | | 12/2009 | |
| KR | 20110018224 | A | * | 2/2011 | ........... H05B 6/6423 |
| KR | 1020110018224 | A | | 2/2011 | |
| KR | 20110019838 | A | * | 3/2011 | ........... H05B 6/6423 |
| KR | 20110063929 | A | | 6/2011 | |
| KR | 1020110063929 | A | | 6/2011 | |
| KR | 101069446 | B1 | | 9/2011 | |
| KR | 101537407 | B1 | | 7/2015 | |
| KR | 101689882 | B1 | | 12/2016 | |
| KR | 101890433 | B1 | | 8/2018 | |
| WO | 2008091061 | A1 | | 7/2008 | |

OTHER PUBLICATIONS

Frigidaire FGMV174KFC Specifications (2013).
GE JNM7196SF1SS Installation Instructions (2013).
GE JNM7196SF1SS Manual (2014).
GE JNM7196SF1SS Specifications (2016).
Jennair JMV8208AAS Installation Instructions (2004).
Jennair JMV8208AAS Manual (2004).
LG LMV1831ST Installation Instructions (2018).
LG LMV1831ST Manual (2017).
LG LMV1831ST Specifications (2015).
Maytag MMV1153WW Installation Instructions (2008).
Maytag MMV1153WW Manual (2009).
Samsung ME17H703SHB Installation Instructions (2022).
Samsung ME17H703SHB Manual (2014).
Samsung ME17H703SHB Specifications (2014).

* cited by examiner

COMBINATION MICROWAVE AND HOOD SYSTEM

CROSS-REFERENCE TO RELATED APPLICATIONS

This application is a continuation of U.S. patent Ser. No. 18/886,749, filed Sep. 16, 2024, now U.S. Pat. No. 12,289, 819, entitled "COMBINATION MICROWAVE AND HOOD SYSTEM", which is a continuation of U.S. patent Ser. No. 18/312,925, filed May 5, 2023, entitled "COMBINATION MICROWAVE AND HOOD SYSTEM", which is a continuation of U.S. patent application Ser. No. 18/073, 694, filed Dec. 2, 2022, now U.S. Pat. No. 12,133,317, entitled "COMBINATION MICROWAVE AND HOOD SYSTEM", which is a continuation of U.S. patent application Ser. No. 16/265,432, filed Feb. 1, 2019, now U.S. Pat. No. 11,523,473, entitled "COMBINATION MICROWAVE AND HOOD SYSTEM," which is a continuation-in-part of and claims priority to U.S. patent application Ser. No. 16/090,440, now U.S. Pat. No. 11,079,118, filed Oct. 1, 2018, entitled "COMBINATION MICROWAVE AND HOOD SYSTEM," which is a U.S. National Stage filing claiming priority to PCT/CN2017/080048 filed Apr. 11, 2017, entitled "COMBINATION MICROWAVE AND HOOD SYSTEM," which claims priority to U.S. Provisional Application No. 62/321,283, filed Apr. 12, 2016, entitled "COMBINATION HOOD AND MICROWAVE FOR ABOVE COOKING APPLIANCE," the entire disclosures of which are incorporated herein by reference.

FIELD OF DISCLOSURE

The present disclosure generally relates to the art of cooking and, more particularly, to a combination hood and microwave system for mounting under cabinetry positioned above a cooking appliance.

BACKGROUND

In the art of cooking, numerous types of cooking appliances are known, including both slide-in and drop-in ranges. Both types of ranges are designed to be situated in a space or cut-out provided along a length of a kitchen countertop. In either case, the range includes at least one oven cavity supported below a cooktop. When the cooktop is utilized for cooking operations, smoke, grease, or the like can be created. To counter the airborne nature of these byproducts, a ventilation unit may be positioned above the range. Ventilation units can take the form of a standalone ventilation hood or can be incorporated into an overhead microwave oven mounted above the range.

To accommodate both the microwave and ventilation functions, combination microwave oven and ventilation hood systems typically have a significant overall vertical dimension. In some cases, there is not enough available vertical distance between the top surface of the cooking appliance and the lowermost portion of the cabinetry to accommodate such an appliance, at least without overly restricting access to rear cooking regions of the cooking appliance.

SUMMARY

According to at least one aspect of the present disclosure, a microwave hood system includes a microwave oven enclosure defining a cooking cavity therein. A cooking component is positioned within the cooking cavity and configured to emit microwaves. Additionally, the heating system defines a heating cavity therein, wherein the heating system is coupled to the microwave oven enclosure. A heating element is positioned in the heating cavity. The heating cavity reaches a temperature in a range from about 40° C. to about 80° C. when the heating element is in use. Further, a broiler element is positioned within the heating cavity. The heating cavity reaches a temperature in a range from about 150° C. to about 300° C. when the broiler element is in use. A dual hood system is also coupled to the microwave hood system.

In at least another aspect of the present disclosure, a microwave hood system includes a microwave oven enclosure defining a cooking cavity. The heating system is coupled to the microwave oven enclosure. The heating system defines a heating cavity configured to withstand cooking temperatures in a range from about 150° C. to about 300° C. Additionally, a salamander cooking unit is positioned in the heating cavity. A dual hood system that includes first and second venting assemblies is positioned on first and second opposing sides, respectively, of at least one of the microwave oven enclosure and the heating system.

In at least another aspect of the present disclosure, a microwave hood system includes a housing. A microwave oven enclosure is positioned in the housing and defines a cooking cavity. The cooking cavity has a cooking component positioned therein, wherein the cooking component is configured to emit microwaves. A heating system is also positioned in the housing and coupled to the microwave oven enclosure. The heating system defines a heating cavity having a broiler element position therein. Further, a dual hood system includes first and second venting assemblies positioned within the housing on first and second opposing sides, respectively, of the microwave oven enclosure and the heating system. Further, the dual hood system recirculates air.

These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which.

The components in the figures are not necessarily to scale, emphasis instead being placed upon illustrating the principles described herein.

DETAILED DESCRIPTION

Figure 2:
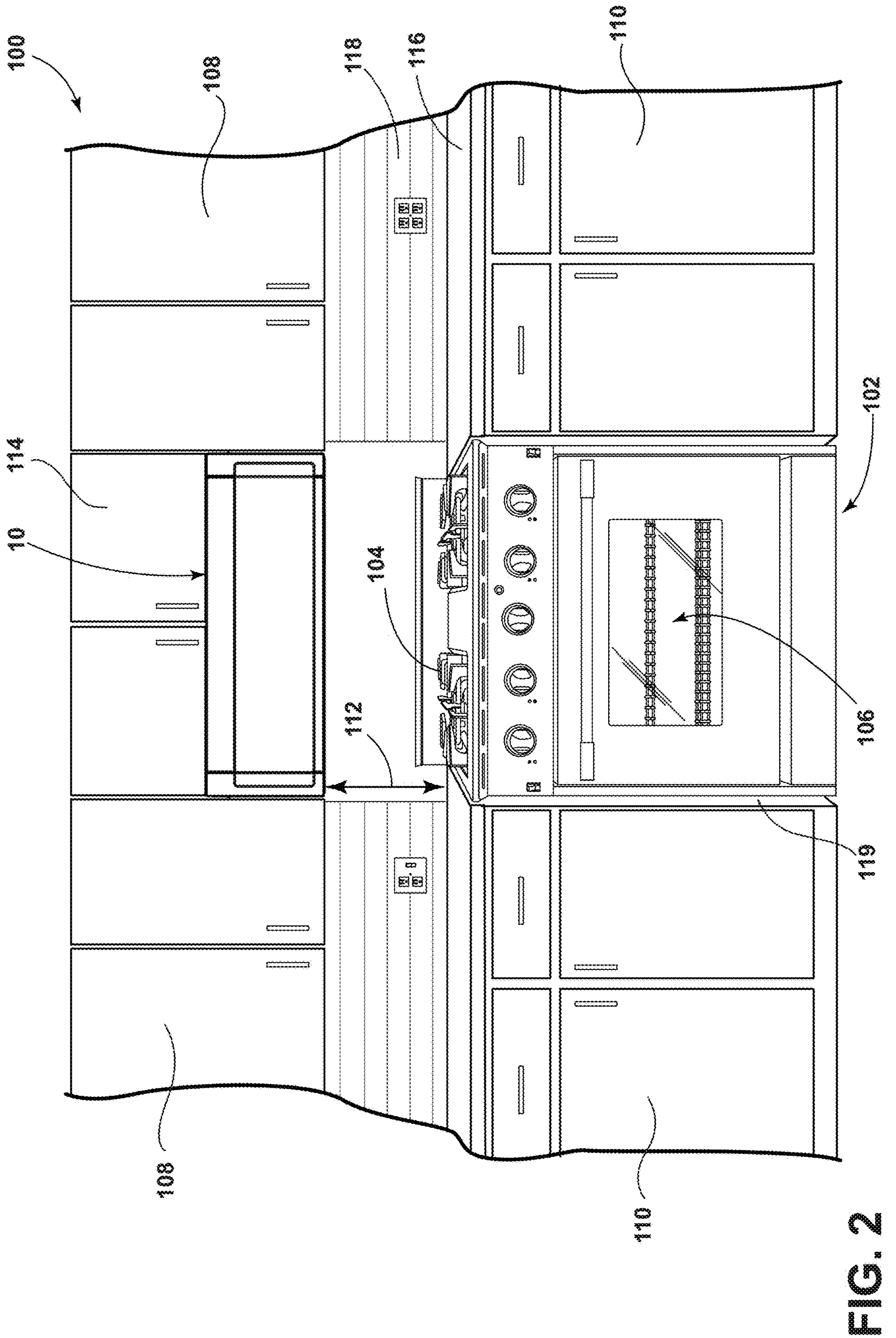
FIG. 2 is a front elevation view of a kitchen environment according to an embodiment of the present disclosure.

The present disclosure is directed to a combined ventilation hood and microwave oven system 10 for mounting above a cooking range 102, as shown in kitchen environment 100 in the illustrated embodiment of FIG. 2. In accordance with one aspect of the disclosure, the microwave oven system 10 has a significantly scaled down overall vertical dimension 30, while still providing effective cooking and ventilation performance, including recirculation ventilation performance. With a scaled down vertical dimension 30, microwave oven system 10 enhances a vertical spacing 112 between the cooking range 102 and microwave oven system 10. As a result, the combined ventilation hood and microwave oven system 10 can be installed in environments where other types of microwave oven systems, including conventional microwave and ventilation hood systems, might obstruct use of the cooking range 102. Therefore, the reduced vertical dimension 30 allows for installation of the combined ventilation hood and microwave oven system 10 in areas that may have previously only been able to accommodate a standalone ventilation hood.

In connection with the overall combined ventilation hood and microwave oven system 10, various embodiments are disclosed which provide enhanced functionality for the cooking space above cooking range 102. In some embodiments, the present disclosure provides a modular heating system 150 (FIGS. 23-29) that may be coupled with the combined ventilation hood and microwave oven system 10 described herein. The modular heating system 150 may also be dimensioned such that, when combined with microwave oven system 10, an overall vertical dimension of the microwave oven system 10 coupled with the modular heating system 150 is similar to a vertical dimension of a conventional microwave oven and ventilation hood system. Additional objects, features and advantages of the present disclosure will become readily apparent from the following detailed description of the embodiments, when taken in conjunction with the drawings wherein like reference numerals refer to corresponding parts in the several views.

The present illustrated embodiments reside primarily in combinations of method steps and apparatus components related to combined ventilation hood and microwave oven systems. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
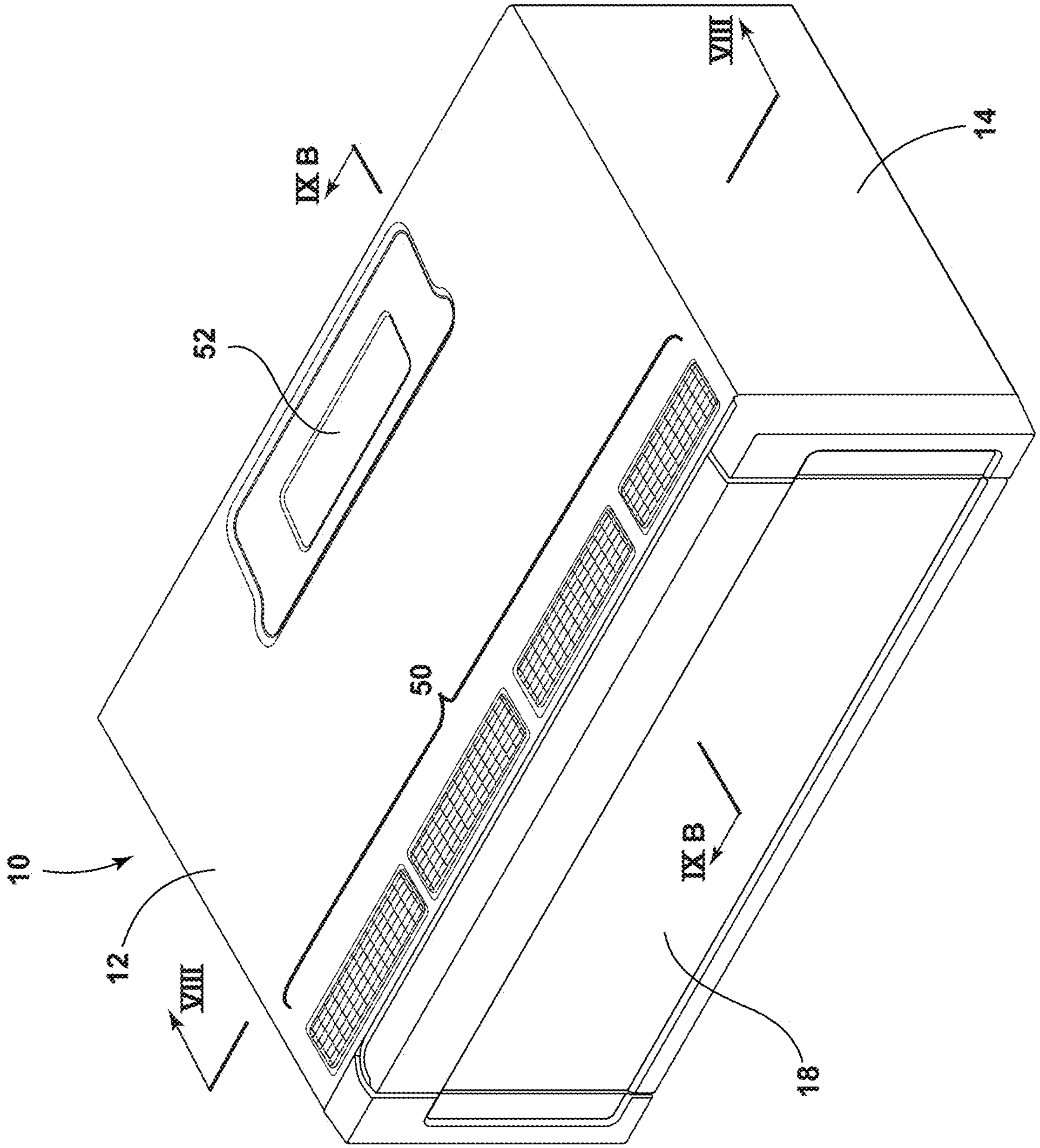
FIG. 1 is a top perspective view of a combined ventilation hood and microwave oven system according to an embodiment of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closest to the user, and the term "rear" shall refer to the surface of the element furthest from the user. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceeded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Kitchen Environment

FIGS. 1-7 depict various views of a combined ventilation hood and microwave oven system 10 in accordance with an illustrated embodiment of the present disclosure. As shown in FIG. 2, combined ventilation hood and microwave oven system 10 may be configured to mount above a cooking appliance such as cooking range 102 in kitchen environment 100. In kitchen environment 100, a cooking appliance such as cooking range 102 may be positioned in a cut-out or opening provided in a countertop 116 and between adjacent lower cabinetry 110. Countertop 116 extends to a rear upstanding wall 118. Upstanding wall 118 extends from countertop 116 to upper cabinetry 108, which may be positioned and mounted on either side of a central cabinetry 114 arranged directly above cooking range 102. In at least one case, as discussed in more detail below, combined ventilation hood and microwave oven system 10 may be mounted below central cabinetry 114 and above cooking range 102.

In FIG. 2, cooking range 102 is depicted as a gas fuel type range having multiple cooktop elements 104 for cooking as well as an oven cavity 106 for baking. During use, cooktop elements 104 and oven cavity 106 may produce smoke, grease, or other airborne byproducts. To counter the potential detrimental effects of this cooking exhaust air, a ventilation system may be used to draw in and, to either filter and recirculate the exhaust air, or redirect the associated byproducts to an outside area through an outside vent. As described in more detail below, combined ventilation hood and microwave oven system 10 may provide a microwave cooking function as well as a recirculation and outside venting for contaminated exhaust air. While a particular kitchen environment has been described, those skilled in the art will recognize that kitchen environment 100 is only exemplary and may include more or fewer cabinetry elements, or other kitchen elements, and still fall within the spirit and scope of the present disclosure. In addition, cooking range 102 is only exemplary and other configurations and types of cooking appliances including cooking appliances of all fuel types as well as built-in cooktops may be incorporated into a kitchen environment relevant to aspects described herein.

Microwave Oven System

Figure 6:
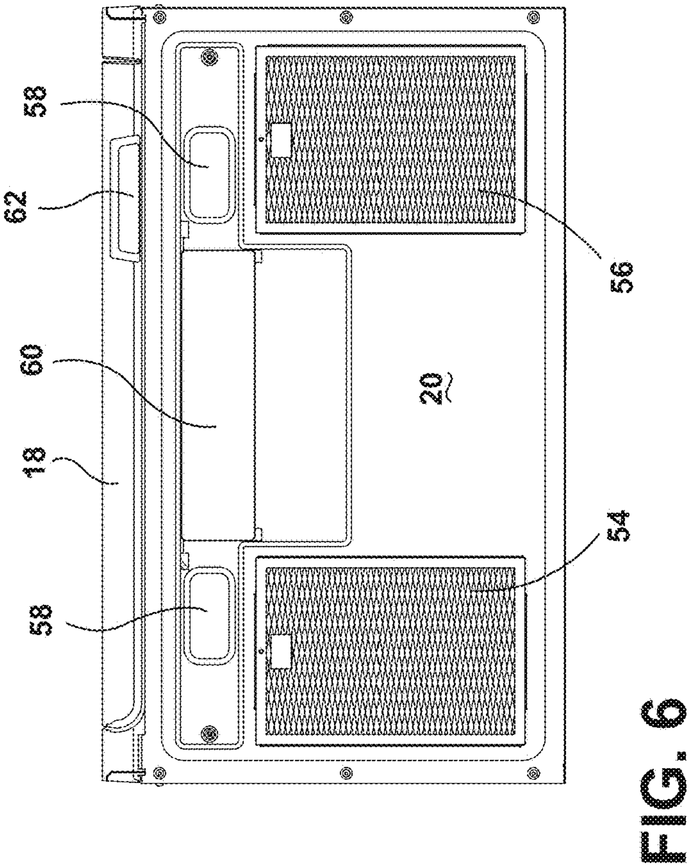
FIG. 6 is a bottom plan view of the combined ventilation hood and microwave oven system according to an embodiment of the present disclosure.
Figure 7:
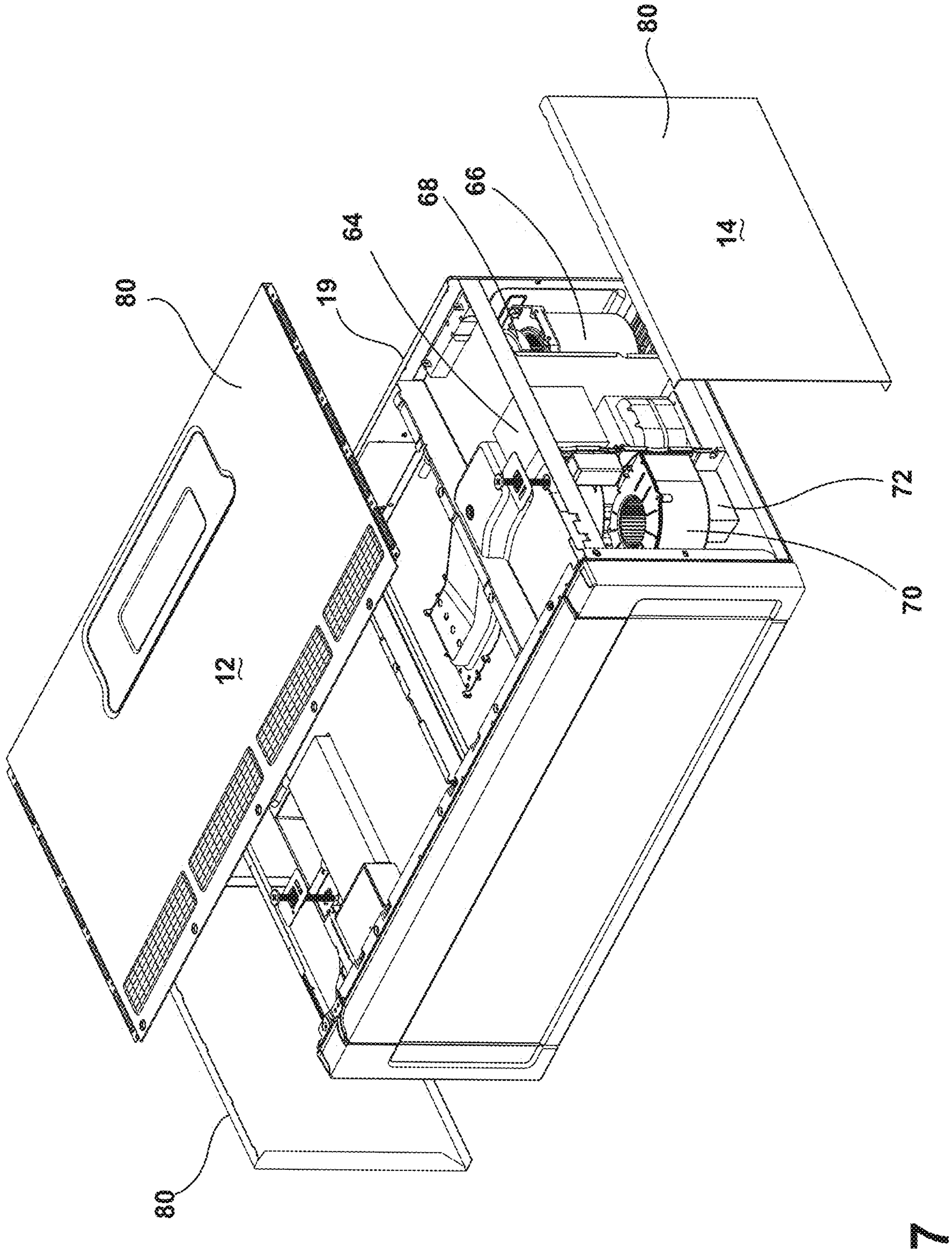
FIG. 7 is partially exploded top perspective view of the combined ventilation hood and microwave oven system according to an embodiment of the present disclosure.

FIGS. 1-7 illustrate various views of a combined ventilation hood and microwave oven system 10 according to one embodiment of the present disclosure. As shown in the illustrated embodiment, microwave oven system 10 includes a cooking cavity 34 for cooking food, surrounded by an external enclosure. The external enclosure may include an outer wrapper 80 having a top portion 12, a right portion 14 and a left portion 16. Top portion 12 may have a plurality of air passages 50 disposed thereon (described in more detail below). Top portion 12 may also include an outside vent outlet 52 disposed thereon. In addition to outer wrapper 80, the external enclosure of microwave oven system 10 includes a door 18 for accessing cooking cavity 34, a bottom surface 20 and a rear surface 19 (FIG. 7).

Figure 3:
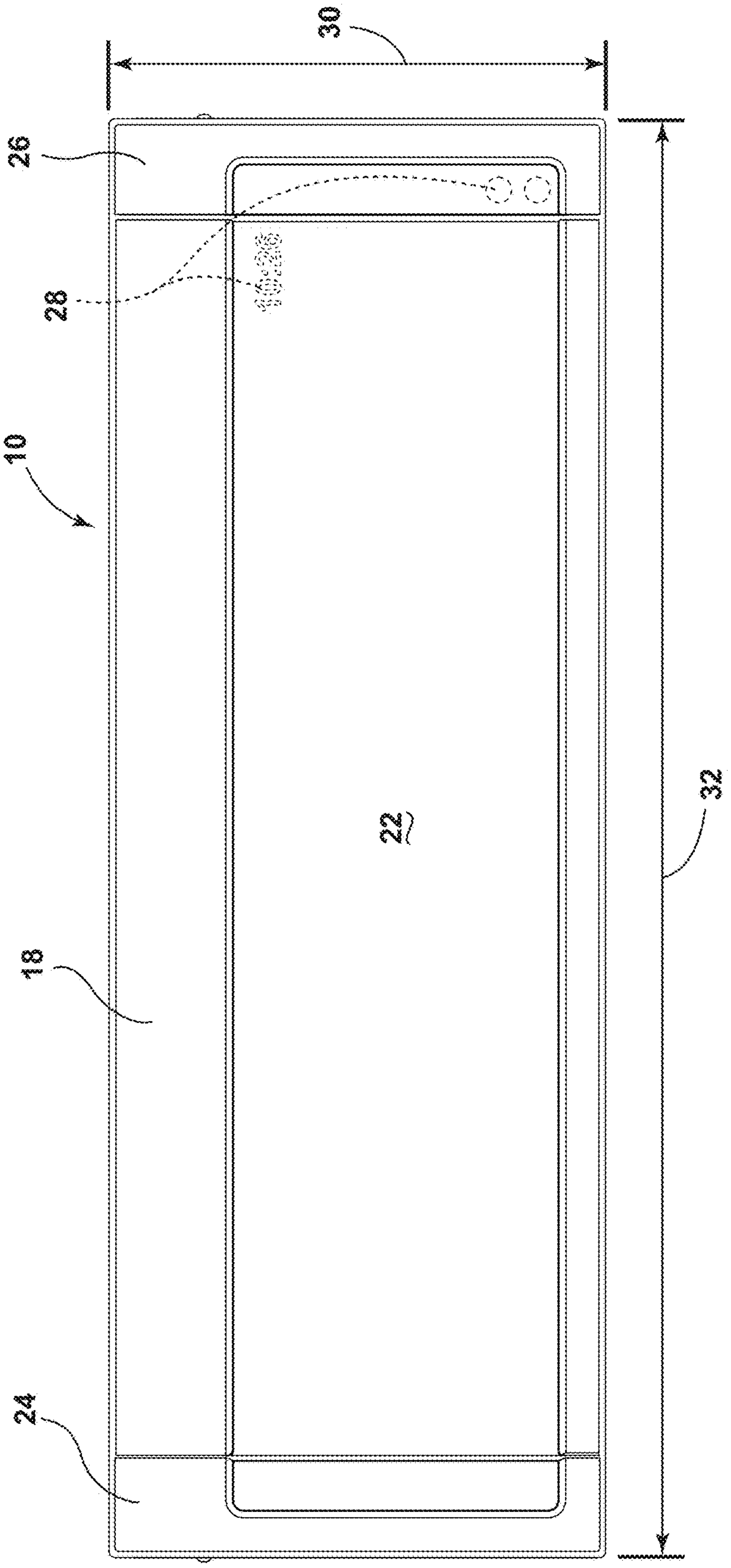
FIG. 3 is a front elevation view of the combined ventilation hood and microwave oven system according to an embodiment of the present disclosure.
Figure 4:
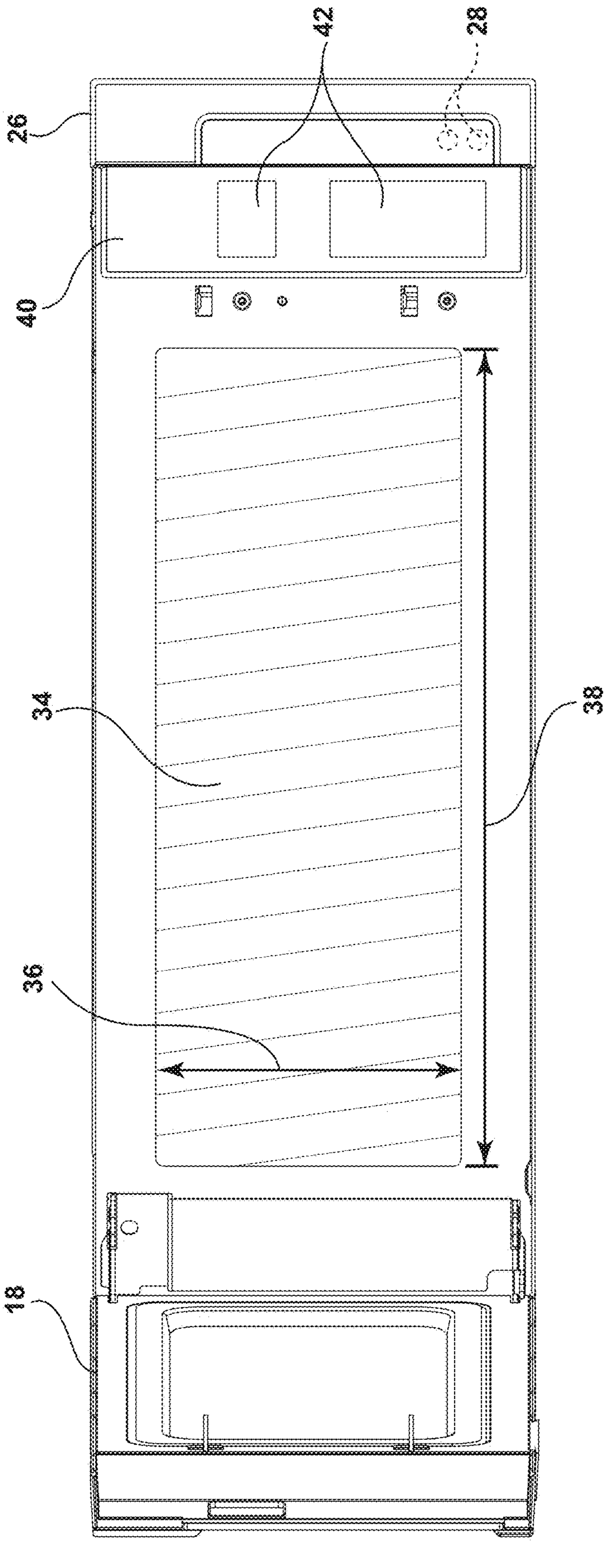
FIG. 4 is another front elevation view of the combined ventilation hood and microwave oven system according to an embodiment of the present disclosure.

As shown in the illustrated embodiment of FIG. 3, in some cases, a front façade of the combined ventilation hood and microwave oven system 10 may include a left façade 24, door 18, and right façade 26, providing an overall symmetrical appearance to microwave oven system 10. In at least one case, door 18 may further include a glass or otherwise transparent viewing portion 22 to allow a user to see into cooking cavity 34. As shown in FIGS. 3 and 4 of the illustrated embodiment, a time display 28 or other user display may be projected to the front surface of the glass door while right façade 26 is reserved for touch controls such as capacitive touch input or other touch controls known in the art. When door 18 is closed (FIG. 3), microwave control interface 42 is hidden and darkened. When door 18 is opened (FIG. 4), microwave control interface 42 may become exposed and illuminated for operation. Microwave control interface 42 may also be illuminated or otherwise activated by a user touch, proximity, or other known methods, for controlling combined microwave oven system 10. As would be known in the art, microwave control interface 42 may include operations for cooking, operating the ventilation hood, adjusting time and/or other light displays, and/or controlling other features that may be incorporated into a microwave oven system 10.

Figure 5:
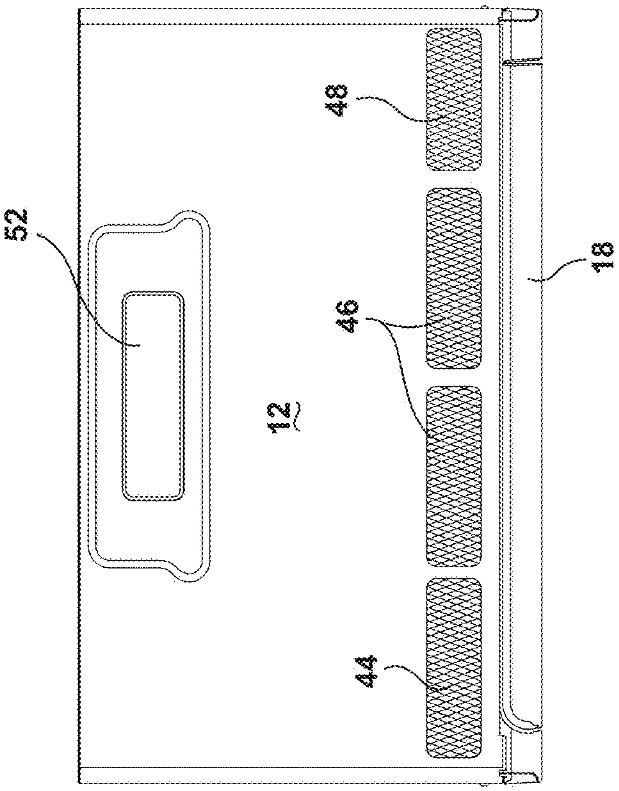
FIG. 5 is a top plan view of the combined ventilation hood and microwave oven system according to an embodiment of the present disclosure.

FIG. 5 depicts various aspects of top portion 12 of the combined ventilation hood and microwave oven system 10 according to the illustrated embodiment. As previously discussed, a surface of outer wrapper 80 may directly incorporate, or otherwise have disposed thereon, air recirculation passages 50 (FIG. 1) for allowing air to be vented into or expelled from microwave oven system 10. In the illustrated embodiment, top portion 12 may include at least one cooling air inlet 48, one or more recirculation vent outlets 46, as well as a cooling air outlet 44. Top portion 12 may also include, incorporate, or otherwise have disposed thereon, an outside vent outlet 52 for venting to an outside area. As will be discussed in more detail below, recirculation vent outlets 46 may provide an exit for contaminated exhaust air after it has been drawn up from cooking range 102. Alternatively, contaminated air may be drawn up from cooking range 102 and expelled to an outside area by way of outside vent outlet 52. Top portion 12 may further include one or more apertures or other fastening elements for fastening microwave oven system 10 to cabinetry such as central cabinetry 114, as discussed in more detail below.

FIG. 6 depicts a bottom surface 20 according to the illustrated embodiment of microwave oven system 10. As seen in FIG. 6, bottom surface 20 may incorporate one or more lights 58, an access cover 60 for accessing various internal components, as discussed in more detail below, a left exhaust inlet cover 54, and a right exhaust inlet cover 56. In at least one embodiment, left exhaust inlet cover 54 and right exhaust inlet cover 56 comprises a mesh filter for filtering contaminated exhaust air as it is drawn in. In other cases, other types of filters, such as charcoal filters or mesh screens, may be utilized for the inlet cover or incorporated in an exhaust outlet area for filtering contaminated exhaust air. FIG. 6 also depicts a bottom surface of door 18 having a pocket door handle 62 defined thereon. Pocket door handle 62 may be utilized for opening door 18, although door 18 may also incorporate other types of door handles or opening mechanisms as would be known by those skilled in the art.

Figure 21:
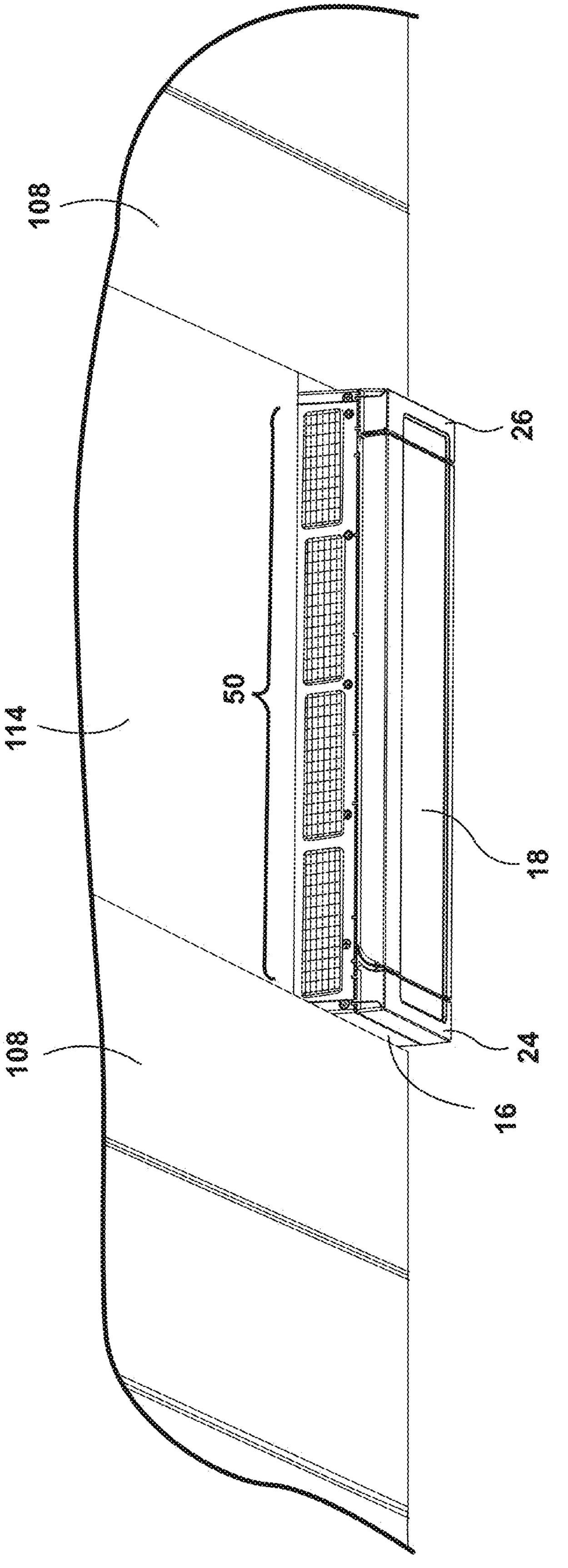
FIG. 21 is a top perspective view of a combined ventilation hood and microwave oven system according to an embodiment of the present disclosure.

The outer wrapper 80 of combined ventilation hood and microwave oven system 10 may be constructed to facilitate ease of manufacturing and design considerations. In conventional systems, an outer wrapper is typically formed from one piece of sheet metal that is bent to form a top portion and two side portions. According to aspects described herein, right portion 14, left portion 16, and top portion 12, collectively outer wrapper 80, may be manufactured in the conventional manner, i.e., together as one bent metal or molded plastic piece. In other cases, however, right portion 14, left portion 16, and top portion 12 may be manufactured separately and pieced together, or may be combined with other portions of microwave oven system 10. In at least one embodiment, right portion 14, left portion 16, and top portion 12 are manufactured as independent pieces, as shown FIG. 7. The three-piece configuration of the illustrated embodiment allows a development design team to vary the materials used for each piece as well as to eliminate the corner bend requirement that would be necessary if the pieces were manufactured from a single piece of sheet metal or a single molded implement. In addition, the three-piece outer wrapper 80 construction allows for different materials to be utilized for each piece. For example, right portion 14 and left portion 16 could be matched to right façade 26 and left façade 24, respectively, for a more coherent and aesthetic appearance against the cabinetry as shown in FIG. 21.

Figure 8:
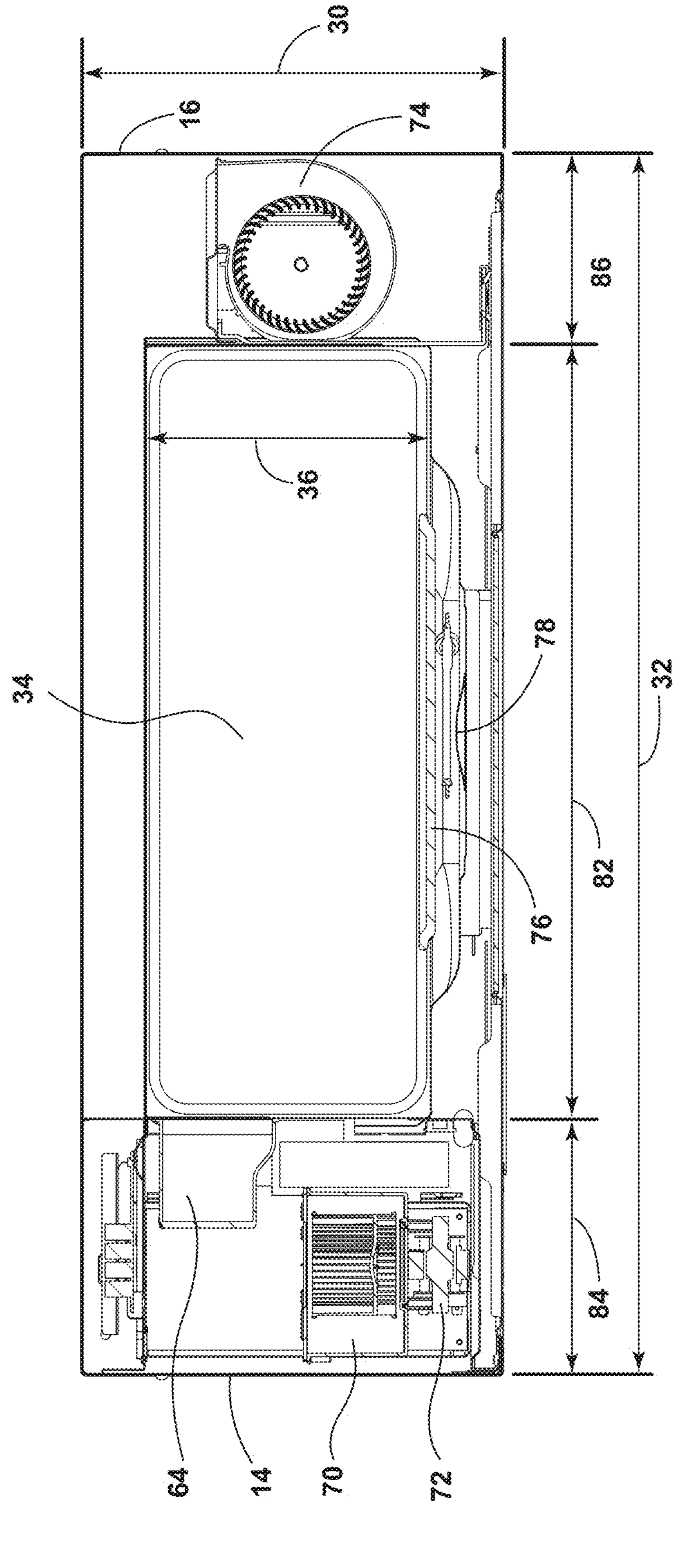
FIG. 8 is a cross-sectional view of the combined ventilation hood and microwave oven system taken across line VIII of FIG. 1.
Figure 9A:
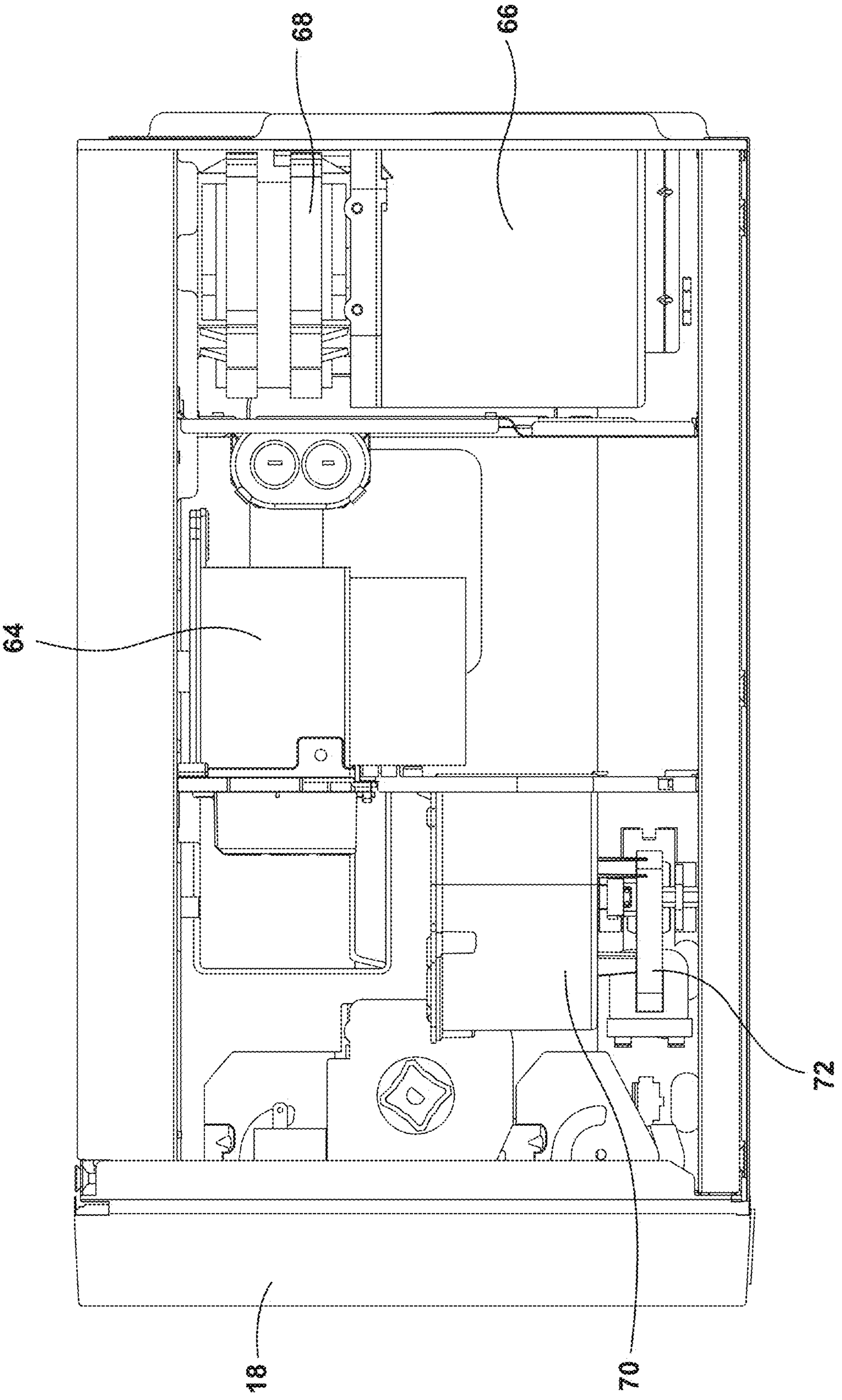
FIG. 9A is a side elevation view of the combined ventilation hood and microwave oven system, with a portion of an external enclosure removed, according to an embodiment of the present disclosure.

FIGS. 8 and 9A depict various internal components and the associated structure that enables microwave cooking and ventilation within the combined ventilation hood and microwave oven system 10. Specifically, FIG. 8 is a cut-away view of microwave oven system 10 across line VIII as shown in FIG. 1. FIG. 9A depicts a right side of microwave oven system 10 with right portion 14 removed.

Referring to FIGS. 8 and 9A, microwave oven system 10 includes conventional microwave oven components for generating and propagating microwaves within cooking cavity 34. In at least one embodiment, microwave oven system 10 includes cooking component area 64, having a magnetron (not shown) for generating microwaves as would be known in the art. In other cases, however microwave oven system 10 may include other known electronics for generating microwaves. Cooking component area may also include other components used for propagating microwaves into cooking cavity 34, such as a provision for directing the microwaves into cooking cavity 34, as well as components for providing power to other portions within microwave oven system 10, such as a vent hood fan motor, a turn table motor 78, lights 58, and control interface 42, as well as other components that are known in the art. Those skilled in the art will recognize that FIGS. 8 and 9A are only exemplary embodiments of the components that may be incorporated into combined ventilation hood and microwave oven system 10, and many other configurations are possible and within the scope of the present disclosure.

To enhance ventilation, microwave oven system 10 may include one or more hood fans to draw in both contaminated air and air for cooling the cooking components, and to help expel the air through the air recirculation passages 50 or outside vent outlet 52. In some cases, hood fans may be located within the external enclosure of microwave oven system 10 in areas that both enhance performance of the ventilation function while minimizing the space required. In some embodiments, for example, one or more hood fans may be located on lateral sides of cooking cavity 34 to both minimize the vertical dimension of microwave oven system 10 and to be positioned over cooktop elements of a cooking appliance located underneath.

Referring to the illustrated embodiment of FIG. 7, microwave oven system 10 may include a right hood fan 66, driven by a right hood fan motor 68. In operation, right hood fan 66 may draw in contaminated exhaust air through right exhaust inlet cover 56. Referring to FIG. 8, microwave oven system 10 may also include a left hood fan 74, driven by a left hood fan motor (not shown). In operation, left hood fan 74 may draw in contaminated exhaust air through left exhaust inlet cover 54. In the illustrated embodiment, right hood fan 66 is disposed between right portion 14 of outer wrapper 80 and cooking cavity 34, and left hood fan 74 is disposed between left portion 16 of outer wrapper 80 and cooking cavity 34. Combined ventilation hood and microwave oven system 10 may also include a cooling fan 70 configured to draw in air and pass it over a cooking component area for cooling one or more cooking components 64 disposed therein.

While the illustrated configuration facilitates the reduced overall vertical dimension 30 of microwave oven system 10, those skilled in the art will recognize that the configurations are only exemplary. In particular, the hood fans may be located in other locations within the external enclosure of microwave oven system 10. Further, the mechanization of the hood fans may be combined or configured in a different manner as would be contemplated by a skilled artisan. Still further, in some embodiments, there may be more or fewer hood fans incorporated into microwave oven system 10, while still providing the benefits described herein.

Venting and Airflow

Figure 10:
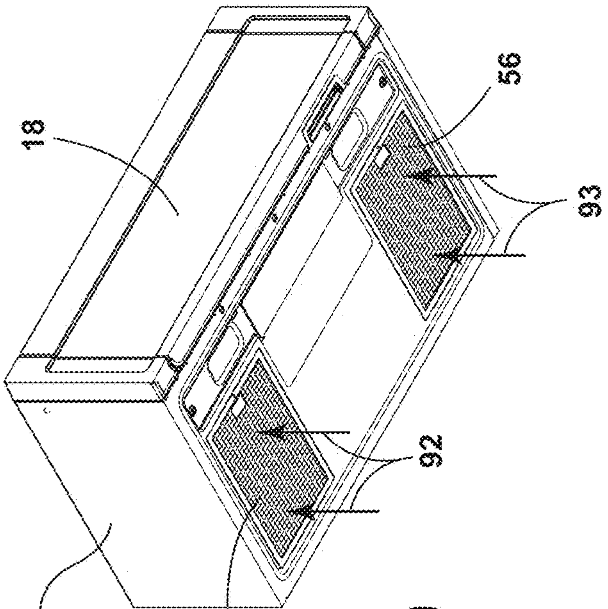
FIG. 10 is a bottom perspective view of airflow into the combined ventilation hood and microwave oven system according to an embodiment of the present disclosure.
Figure 12:
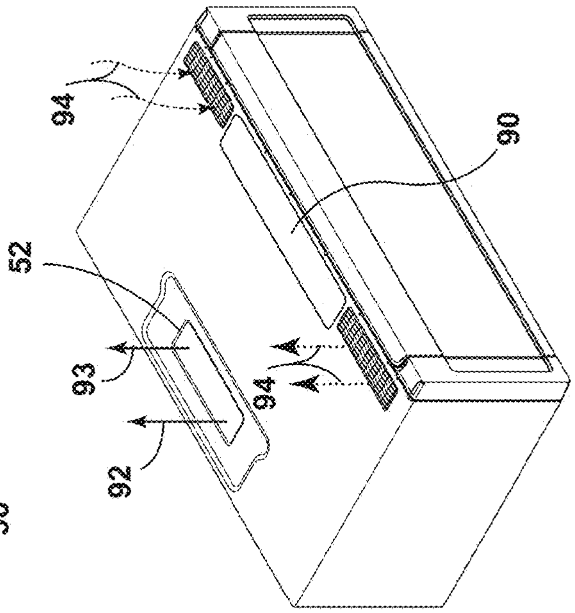
FIG. 12 is another top perspective view of airflow into and out of the combined ventilation hood and microwave oven system according to an embodiment of the present disclosure.
Figure 11:
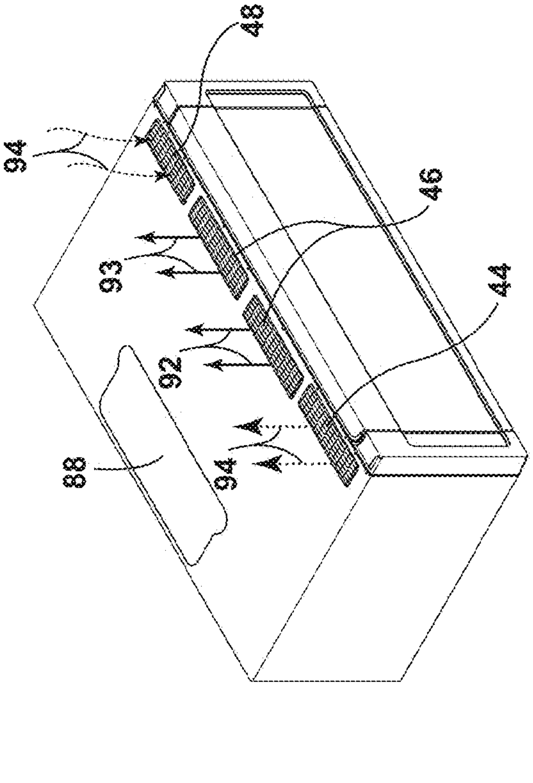
FIG. 11 is a top perspective view of airflow into and out of the combined ventilation hood and microwave oven system according to an embodiment of the present disclosure.

According to aspects of the disclosure, the combined ventilation hood and microwave oven system 10 includes provisions that allow for air circulation, including circulation of contaminated air and cooling air across various microwave components while still providing the benefit of a low profile, or reduced-height, system. In some cases, air inlets and air outlets may be defined on the external enclosure of microwave oven system 10 to provide for air to be passed across cooking component area 64 to cool the microwave cooking components. The provisions may also allow for the recirculation or venting of contaminated air rising from cooking range 102 disposed below. Because the inlets are incorporated into an external enclosure of microwave oven system 10, an overall vertical dimension of microwave oven system 10 can be controlled and minimized. FIGS. 10-12 depict the ingress and egress paths of exhaust air 92, exhaust air 93 and cooling air 94 for microwave oven system 10 according to the illustrated embodiment.

FIG. 10 depicts a bottom perspective view of combined ventilation hood and microwave oven system 10 showing bottom surface 20, according to one embodiment. More specifically, bottom surface 20 includes a left exhaust inlet 54 and right exhaust inlet 56 on opposite lateral sides of bottom surface 20. Left exhaust inlet 54 is aligned with a passageway to left hood fan 74 and right exhaust inlet 56 is aligned with a passageway to right hood fan 66, to draw in contaminated exhaust air 92 and exhaust air 93, respectively. In some cases, left exhaust inlet 54 and right exhaust inlet 56 may be positioned on bottom surface 20 to coincide with contaminated air that is drawn up from cooktop elements 104 arranged therebelow and on lateral sides of a cooking range 102. In other cases, however, exhaust inlets may be positioned in other portions of bottom surface 20. As would be known and contemplated by a skilled artisan, placement of a left exhaust inlet and a right exhaust inlet may ideally be positioned for maximum efficiency for drawing contaminated air from a cooking appliance situated therebelow.

FIGS. 11 and 12 depict the egress of contaminated exhaust air 92 and contaminated exhaust air 93, according to the illustrated embodiment described herein. Specifically, FIG. 11 depicts a top perspective view of combined ventilation hood and microwave oven system 10 showing top portion 12 and the various air passages disposed thereon, and specifically when microwave oven system 10 is operating in a recirculation mode. In a recirculation exhaust mode, exhaust air 92 and exhaust air 93 is drawn up through left vent inlet 54 and right vent inlet 56, respectively, routed through an interior of microwave oven system 10, as described in more detail below, and exhausted through recirculation vent outlets 46 disposed on outer wrapper 80. In a recirculation mode, outside vent outlet 52 may be covered with a cover 88 to prevent the exit of air. In an outside vent outlet mode, as shown in more detail in FIG. 12, exhaust air 92 and exhaust air 93 is drawn up through left vent inlet 54 and right vent inlet 56, respectively, routed through an interior of microwave oven system 10, as described in more detail below, and expelled through outside vent outlet 52, which is coupled to an outside area.

Figure 13:
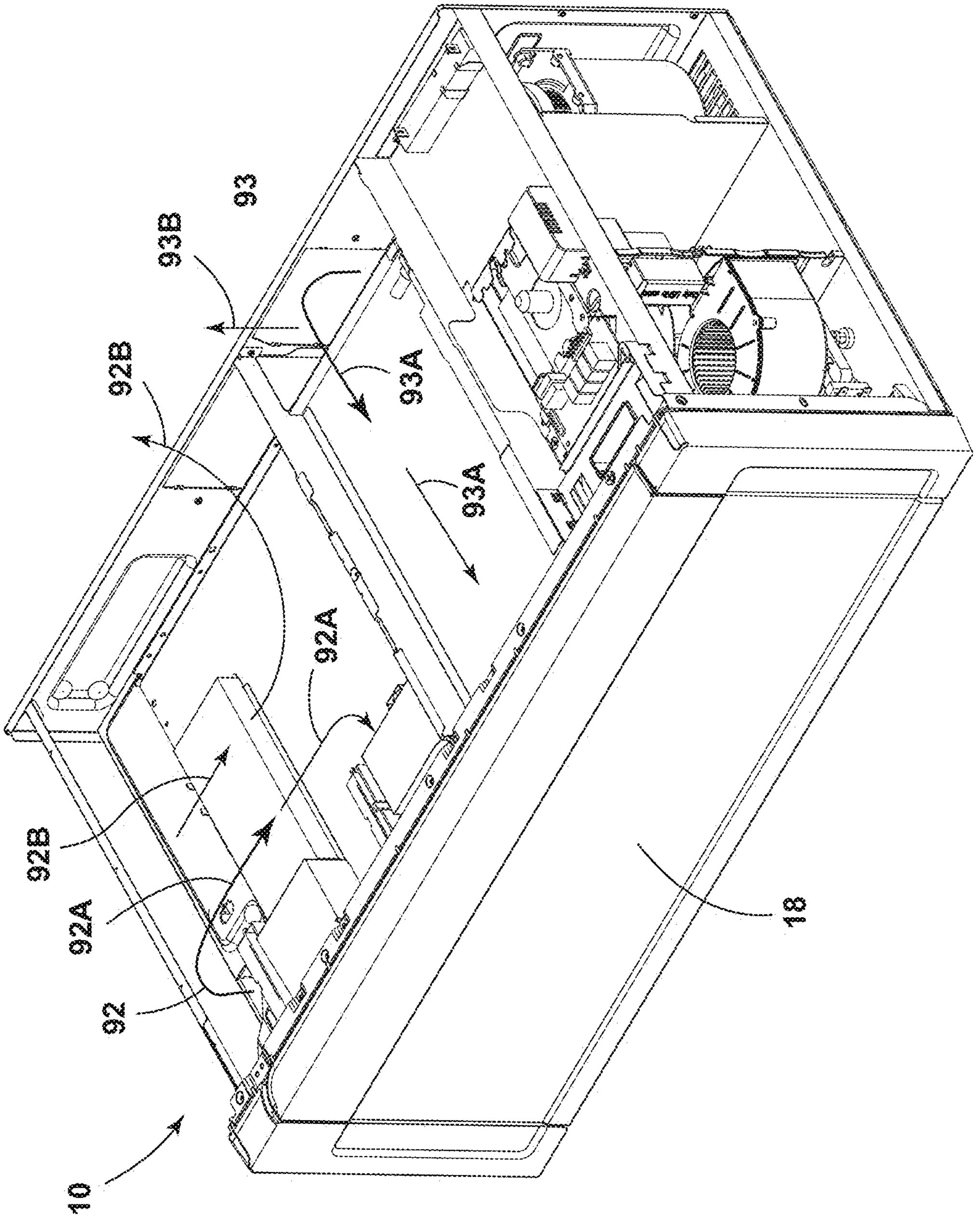
FIG. 13 is a top perspective view of a combined ventilation hood and microwave oven system, with a portion of an external enclosure removed, according to an embodiment of the present disclosure.
Figure 14:
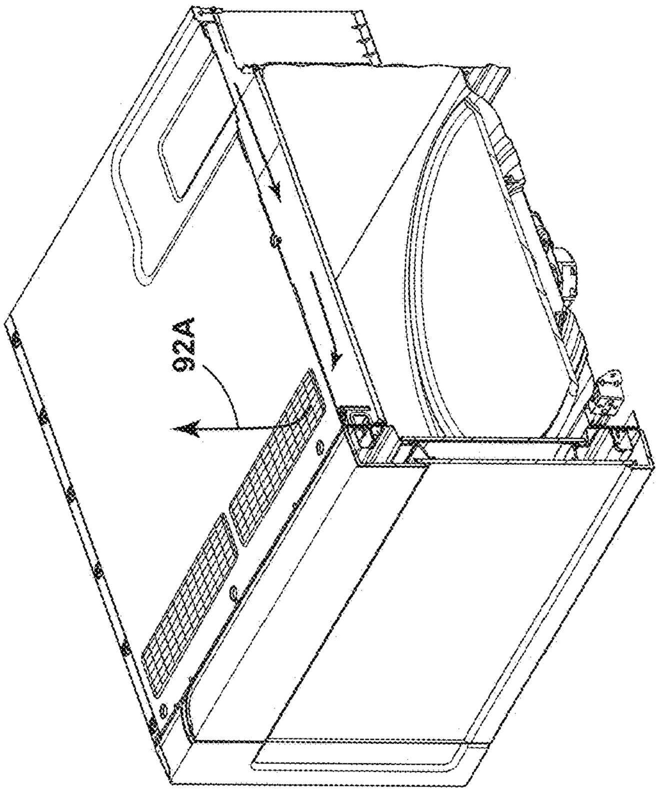
FIG. 14 is a cut-away view of a combined ventilation hood and microwave oven system according to an embodiment of the present disclosure.

FIGS. 13 and 14 depict the path of contaminated air as it is drawn through left vent inlet 54 and right vent inlet 56, and routed within microwave oven system 10. When operated in recirculation mode, in a first path, path A, shown in FIGS. 13 and 14, exhaust air 92 and exhaust air 93 is routed to a front portion of microwave oven system 10 and out recirculation vent outlets 46. When operated in an outside venting mode, in a second path, path B, exhaust air 92 and exhaust air 93 is routed to a back portion of microwave oven system 10 and out outside vent outlets 52.

Figure 15:
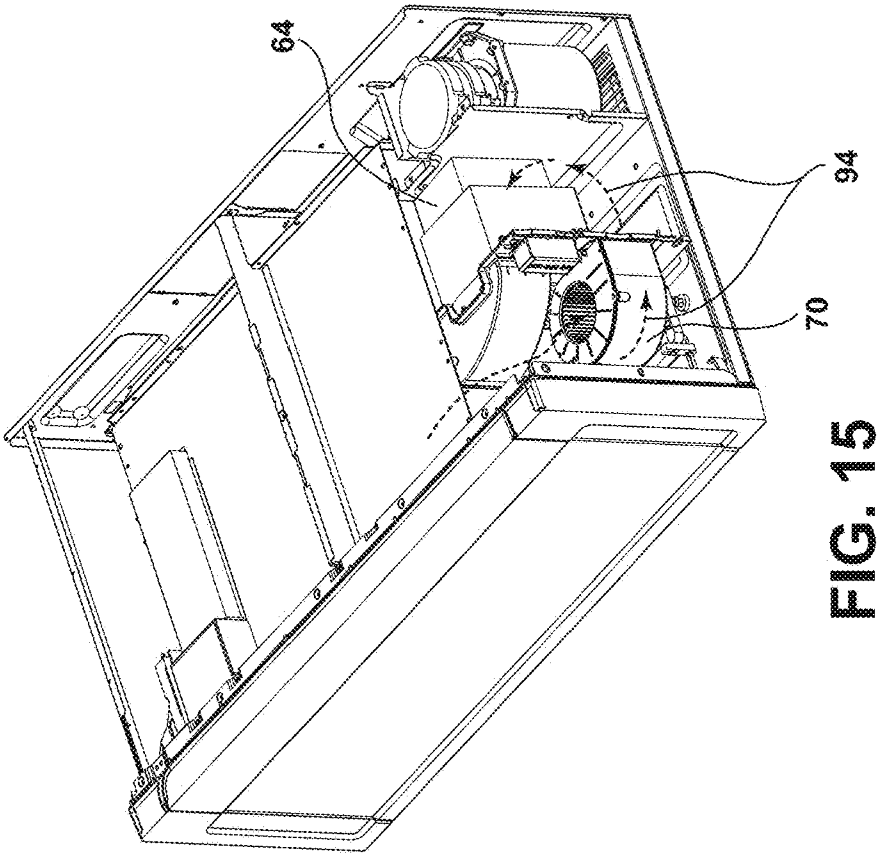
FIG. 15 is a top perspective view of a combined ventilation hood and microwave oven system, with a portion of an external enclosure removed, according to an embodiment of the present disclosure.
Figure 16:
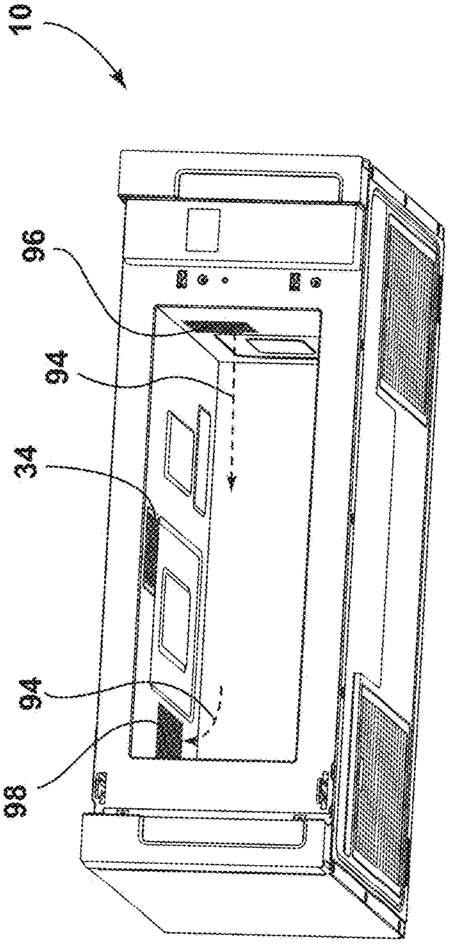
FIG. 16 is a bottom perspective view of a combined ventilation hood and microwave oven system, with a portion of an external enclosure removed, according to an embodiment of the present disclosure.
Figure 17:
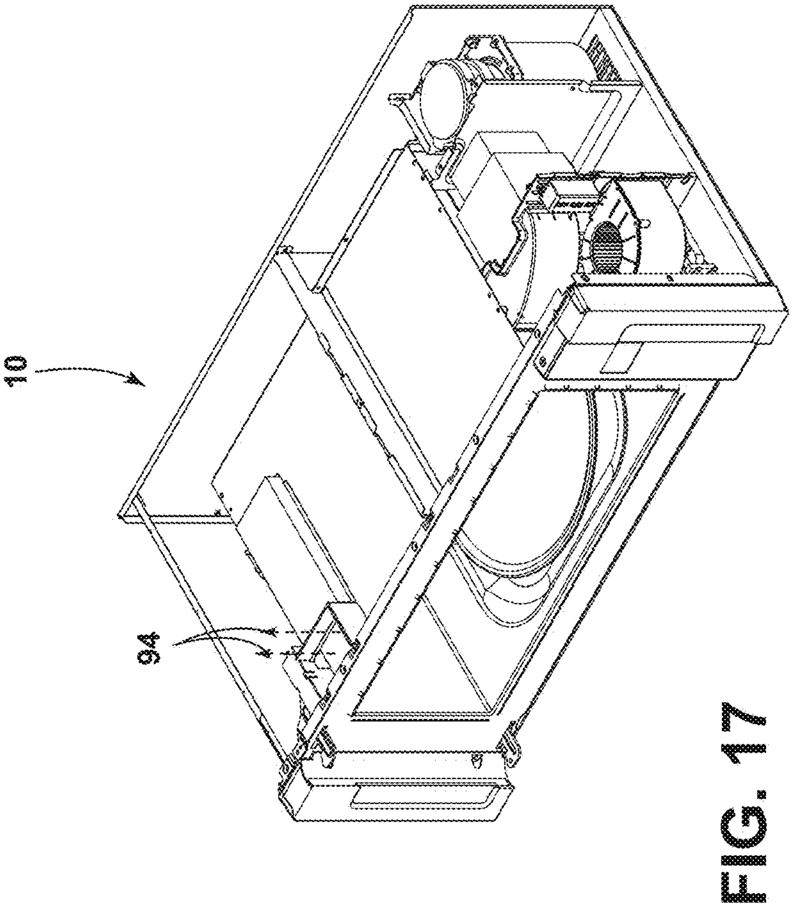
FIG. 17 is a top perspective view of a combined ventilation hood and microwave oven system, with a portion of an external enclosure removed, according to an embodiment of the present disclosure.

FIGS. 11 and 12 also depict the ingress and egress of cooling air 94 for cooling cooking components, i.e. cooking component area 64, within microwave oven system 10 according to the illustrated embodiment described herein. Specifically, when operated in both a recirculation mode, as shown in FIG. 11, and an outside vent mode, as shown in FIG. 12, cooling air 94 may be drawn in through cooling air inlet 48 and expelled though cooling air outlet 44. FIGS. 15-17 depict an exemplary path of cooling air within microwave oven system 10. Specifically, FIG. 15 shows cooling air drawn in by cooling fan 70 and routed across cooking component area 64. Once routed across cooking component area 64 in FIG. 16, cooling air 94 is passed through a first cooking cavity air passage 96 on a surface of cooking cavity 34, across cooking cavity 34, and out a second cooking cavity air passage 98 on a top surface of cooking cavity 34. The second cooking cavity air passage 98 is routed up, as shown in FIG. 17, eventually through cooling air outlet 44, as shown in FIGS. 11 and 12.

The lateral locations of the vent hoods and the cooling fan in the illustrated embodiment, as well as the airflow configuration within the external enclosure allows for a low-profile configuration of microwave oven system 10. However, the present disclosure is not limited to the specific configurations described herein or shown in the illustrated embodiments. For example, alternative pathways for airflow may be established within microwave oven system 10 by placing inlet and outlet vents on side portions of the outer wrapper 80, allowing for alternative egress of contaminated air and cooling air. Additionally, all air may be routed to an outside vent outlet allowing for a design of the microwave oven system that is flush against the kitchen environment cabinetry. Those skilled in the art will recognize that many configurations are possible, including the placement of and the number of components such as vent hood fans and cooling fans within microwave oven system 10, and still fall within the spirit and scope of the present disclosure.

Microwave Oven System Sizing and Install Configuration

Facilitated by aspects described herein, the combined ventilation hood and microwave oven system 10 may exhibit a scaled down overall vertical dimension compared to known, and conventional, microwave and ventilation hood systems. With reference to FIGS. 3 and 4, both an internal cavity vertical dimension 36 of cooking cavity 34 as well as an overall vertical dimension 30 of microwave oven system 10 may be reduced, yet still provide effective microwave cooking and ventilation performance. In particular, microwave oven system 10 may provide an overall reduced vertical dimension, while still maximizing the volume of the cooking cavity 34. In accordance with at least one embodiment, and described in more detail in the following paragraphs, microwave oven system 10 includes a cooking cavity volume that is at least 35% of an overall volume of an external enclosure of microwave oven system 10.

In some embodiments, microwave oven system 10 may have an overall vertical dimension 30 of less than approximately 300 millimeters and an internal cavity vertical dimension 36 of less than approximately 200 millimeters. In at least one case, microwave oven system 10 may have an overall vertical dimension 30 of no greater than about 262 millimeters or just over 10 inches and an internal cavity vertical dimension 36 of no greater than about 177 millimeters or just under 7 inches. Thus, the internal cavity vertical dimension 36 is at least 68% of the overall vertical dimension 30. With this configuration, a combined ventilation hood and microwave oven system 10 as disclosed herein may have an overall vertical dimension 30 that is about 40% less than a conventional combined microwave oven and hood system, thereby significantly increasing the spacing between a cooking range 102 and the combined ventilation hood and microwave oven system 10. The resulting combined ventilation hood and microwave oven system 10 provides reduced cooking obstruction for a cooking appliance disposed below, such as cooking range 102. In addition, the reduced vertical height dimension may allow for the combined ventilation hood and microwave oven system 10 to be installed in areas that previously could only accommodate a stand-alone ventilation hood.

Figure 9B:
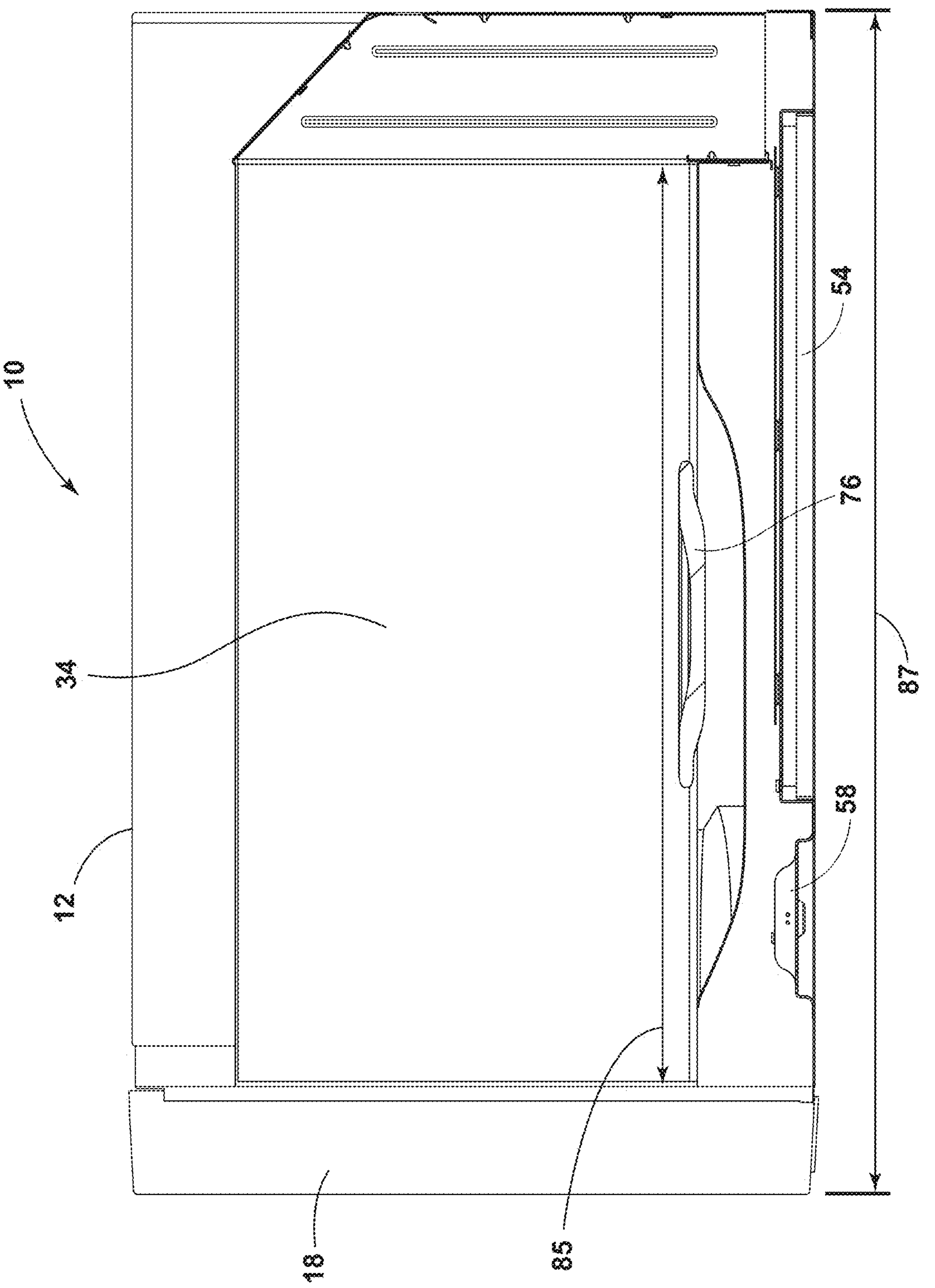
FIG. 9B is a cross-sectional view of the combined ventilation hood and microwave oven system taken across line IXB of FIG. 1

To account for the reduced vertical dimension, in some cases, a combined ventilation hood and microwave oven system as disclosed herein may have a scaled-up overall depth dimension 87 (FIG. 9B). In some cases, for example, microwave oven system 10 may have an overall depth dimension 87 of about 18 inches, or about 456 mm, and an internal cavity depth dimension 85 of about 14.8 inches, or about 378 mm. In other cases, however, the overall depth dimension 87 and the internal cavity depth dimension 85 may be greater or smaller, based on the configuration of microwave oven system 10.

As shown in FIG. 3, combined ventilation hood and microwave oven system 10 may also include a specified horizontal dimension 32 to accommodate standard cabinetry dimensions known around the world and as would be known in the art. For example, in at least one case, horizontal dimension may be no greater than a standard 24 inches (about 609 mm) and could be accommodated by cabinetry systems in countries having 24 inch (about 609 mm) standardized cabinetry structures. In another case, however, microwave oven system 10 may be configured such that overall horizontal dimension 32 is no greater than a standard 30 inches (about 760 mm) and could be accommodated by cabinetry systems in countries having 30 inch (about 760 mm) standardized cabinetry structures.

To accommodate a varying overall horizontal dimension 32, the internal cavity horizontal dimension 38 may be sized larger or smaller as would be known by those skilled in the art. Specifically, with reference to FIG. 8, the internal cavity horizontal dimension 82 may be adjusted, thereby adjusting right side cavity dimension 84 and left side cavity dimension 86. Of course, in other cases the overall vertical dimension 30 and overall horizontal dimension 32 may be varied based on other structural needs as would be contemplated in the art and still fall within the spirit and scope of the present disclosure.

Figure 20:
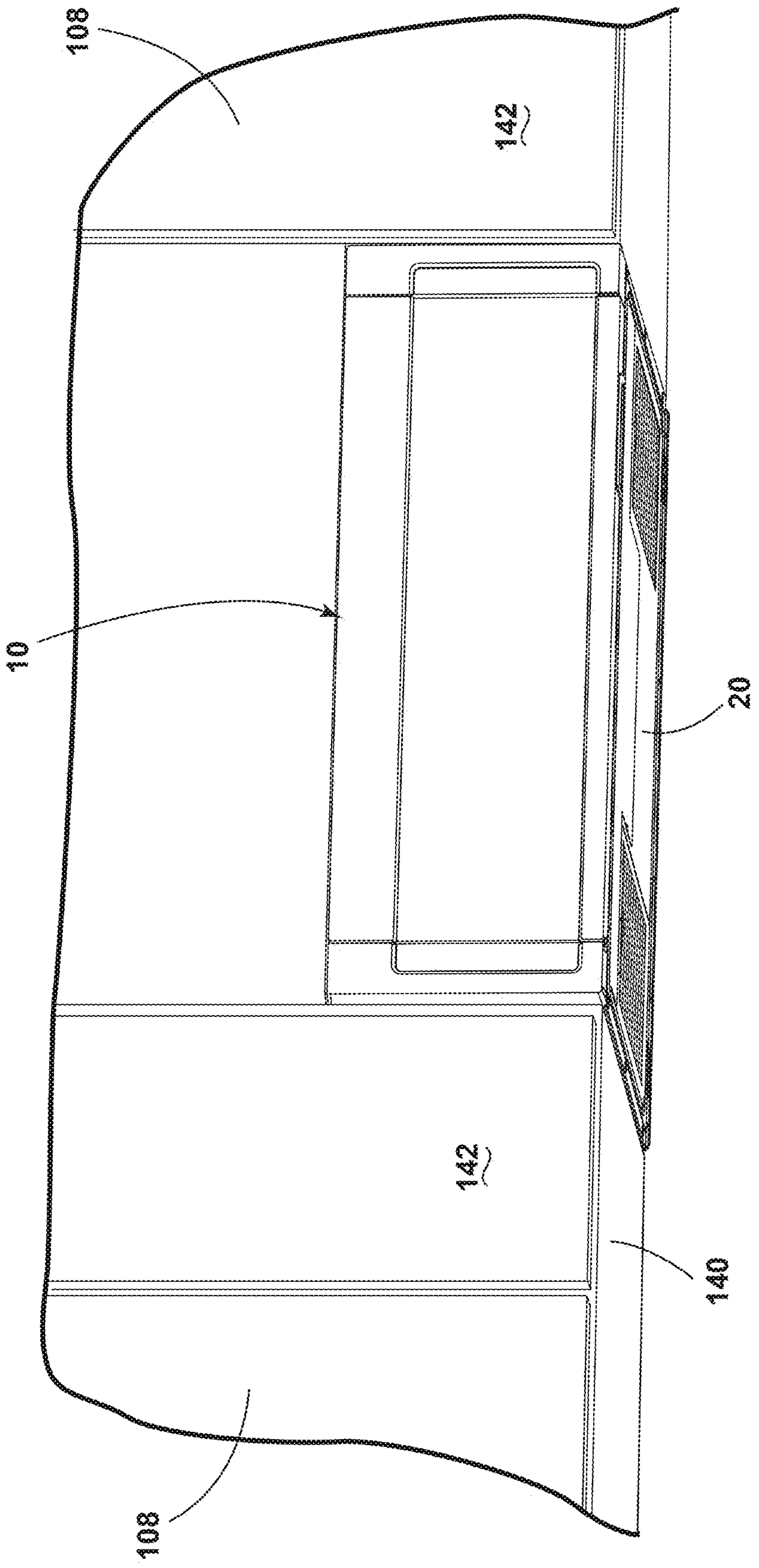
FIG. 20 is a bottom perspective view of a combined ventilation hood and microwave oven system according to an embodiment of the present disclosure.

FIGS. 20 and 21 depict a bottom perspective view and a top perspective view, respectively, of combined ventilation hood and microwave oven system 10 installed under central cabinetry 114 and between upper cabinetry 108 in a kitchen environment 100. According to some embodiments, the outer wrapper 80 of microwave oven system 10, when mounted below central cabinetry 114, may project forward of the cabinetry to allow for vent placement. In some cases, as shown in the illustrated embodiment, air recirculation passages 50 may be disposed on top portion 12 of microwave oven system 10, as described above. However, in other cases, air passages may be disposed on other areas of the outer wrapper 80, such as on right portion 14 and/or on left portion 16 and still allow for establishment of cooling air channels and venting paths within a combined ventilation hood and microwave oven system having a reduced vertical dimension. In still other cases, a microwave oven system according to embodiments herein may not project out from a cabinetry, the door being situated such that it is flush with the cabinetry face and the recirculation and venting of air within the microwave oven may be accomplished through a vent outlet directed to an outside area such as outside vent outlet. Further, with reference to FIG. 20, in at least one embodiment, bottom surface 20 is flush with bottom surface 140 of upper cabinetry 108. This flush design allows for a more consistent vertical depth 30 as well as a more aesthetic and low-profile feel to microwave oven system 10.

Figure 22:
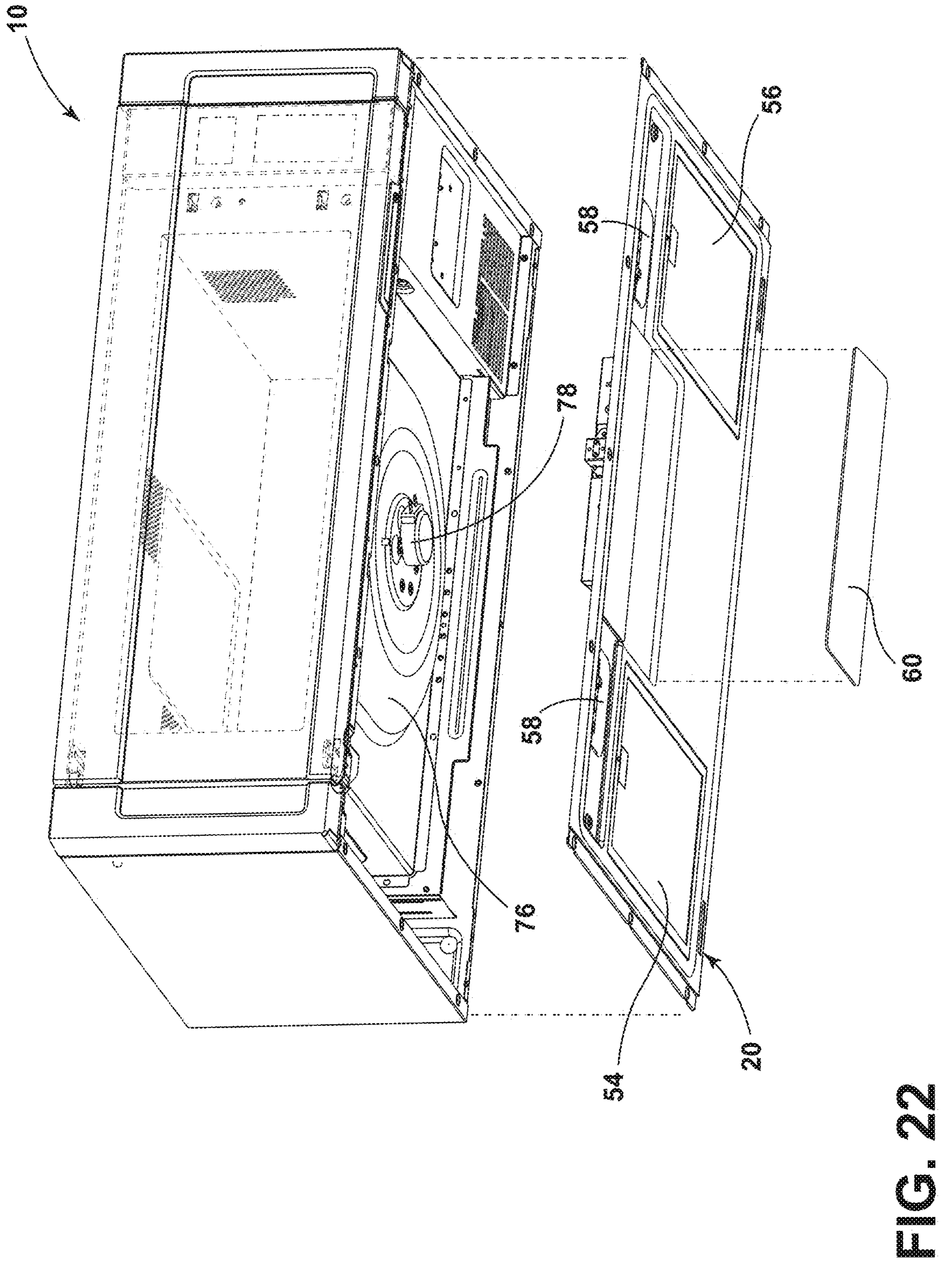
FIG. 22 is a partially exploded bottom perspective view of portions of a combined ventilation hood and microwave oven system according to an embodiment of the present disclosure.
Figure 23:
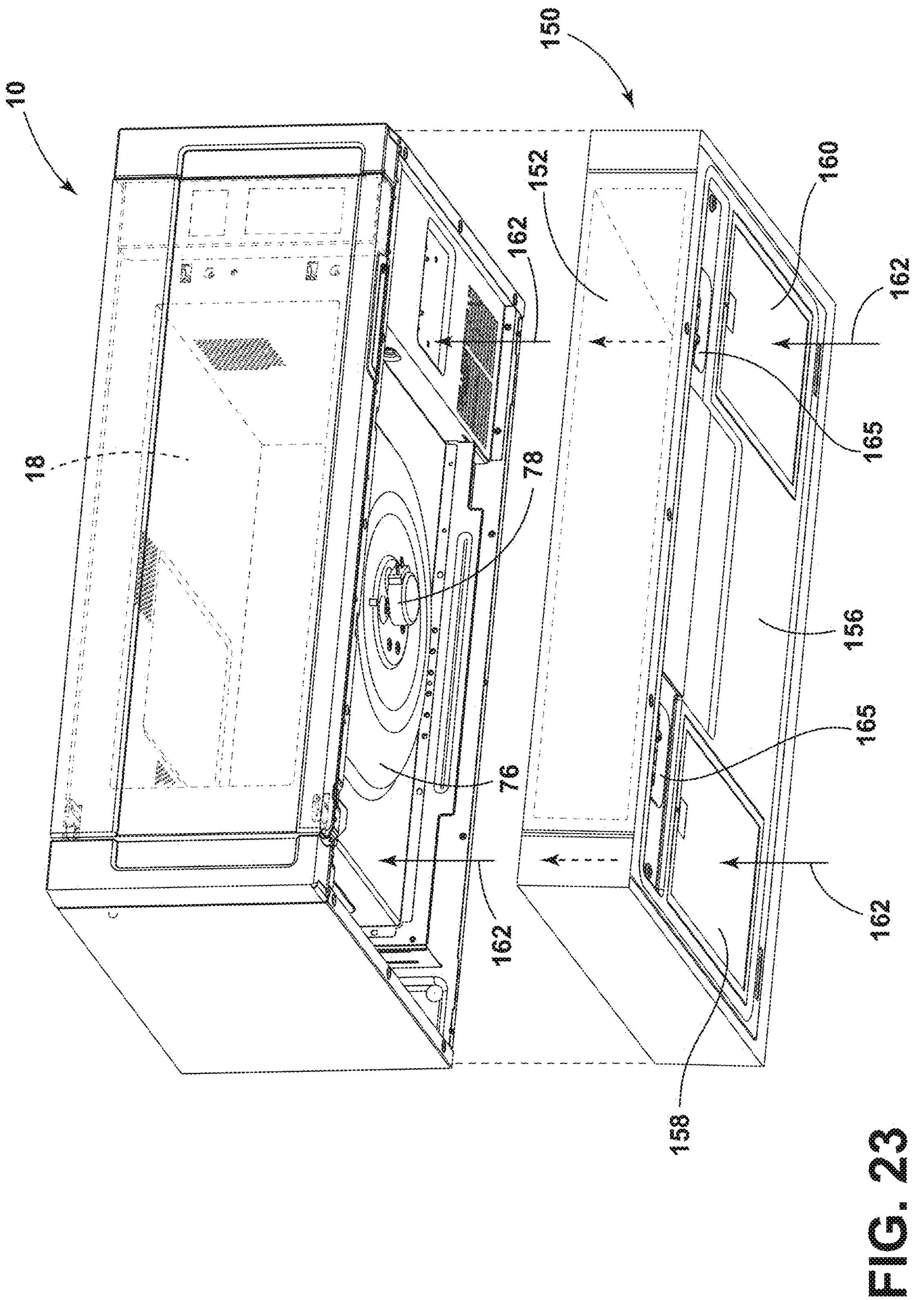
FIG. 23 is a partially exploded bottom perspective view of portions of a combined ventilation hood and microwave oven system according to another embodiment of the present disclosure.
Figure 24:
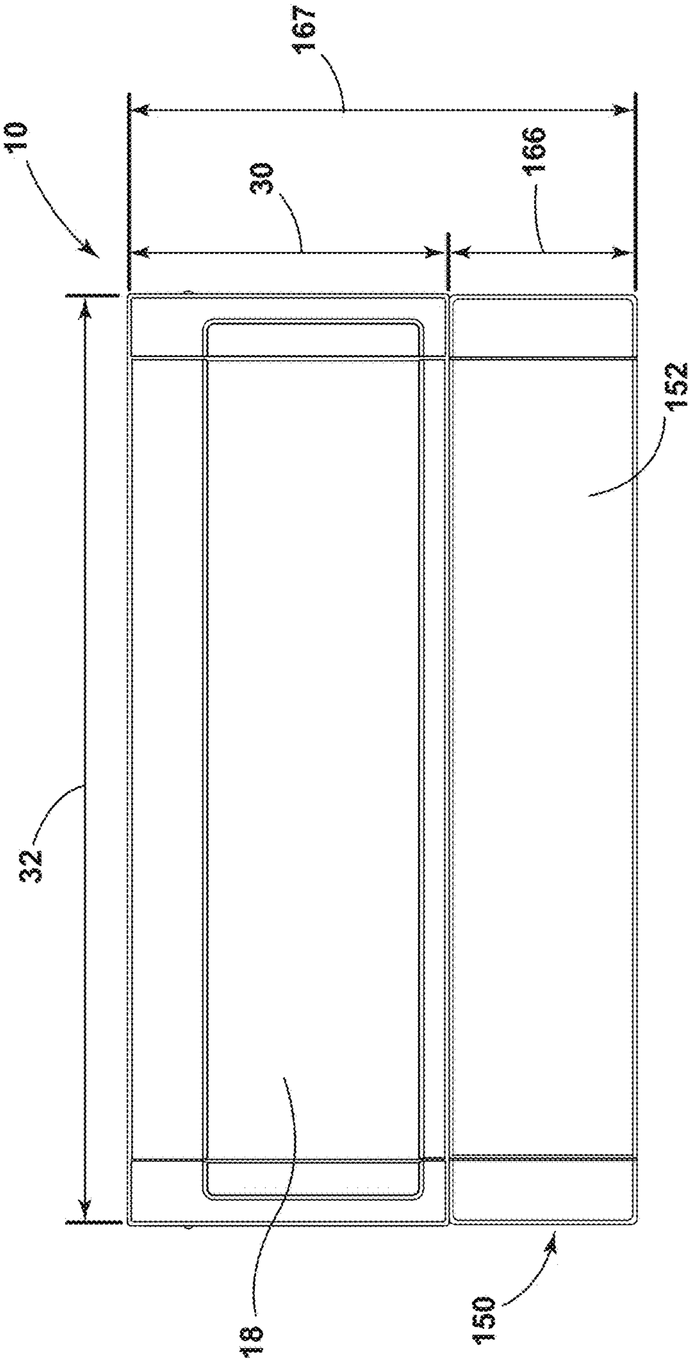
FIG. 24 is a front elevation view of the combined ventilation hood and microwave oven system according to another embodiment of the present disclosure.

Bottom surface 20 of microwave oven system 10 may also include provisions to facilitate repair and replacement of one or more internal components. For example, in conventional microwave oven systems, in order to repair a turntable motor or replace a light, entire bottom plate of the microwave oven must be removed, or a mounted microwave must be removed from its mounting. According to an embodiment disclosed herein, bottom surface 20 may include removable access cover 60 for access to interior portions of microwave oven system 10. More specifically, as shown in an exploded bottom portion of microwave oven system 10 in FIG. 22, access cover 60 may be removed to gain access to turntable motor 78, disposed under turntable indention 76, within the external enclosure of microwave oven system 10.

Mounting

According to further aspects of the disclosure, certain provisions may be incorporated into portions of the outer wrapper 80 of a microwave oven system 10 to facilitate mounting beneath an upper cabinetry, such as central cabinetry 114. For example, in some cases, separate top mounting hardware may help position microwave oven system 10 with respect to a fastener connected to an upper central cabinetry 114. In other cases, apertures may be positioned on the outer wrapper 80 that will receive a mounting fastener at multiple positions.

Figure 18A:
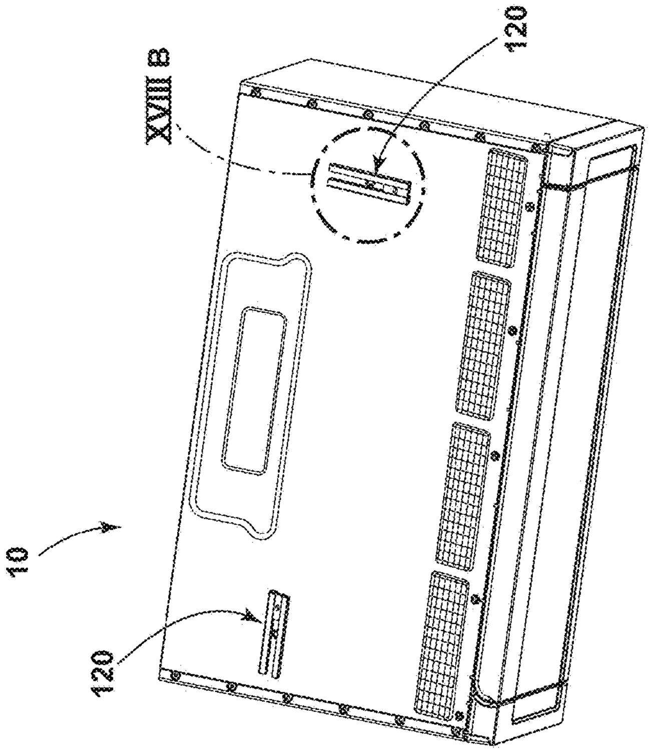
FIGS. 18A-18C and 19A-19B are various views of portions of mounting systems according to embodiments of the present disclosure.
Figure 18B:
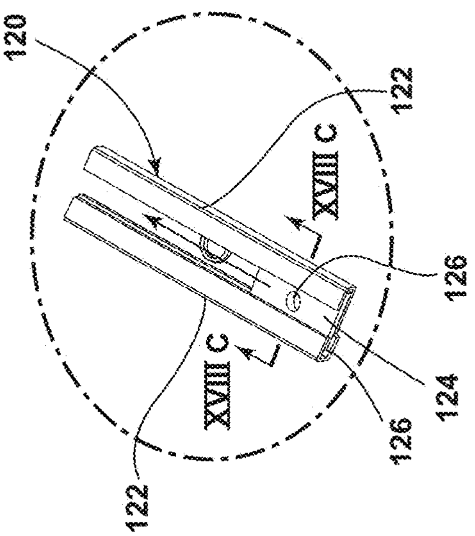
Figure 18C:
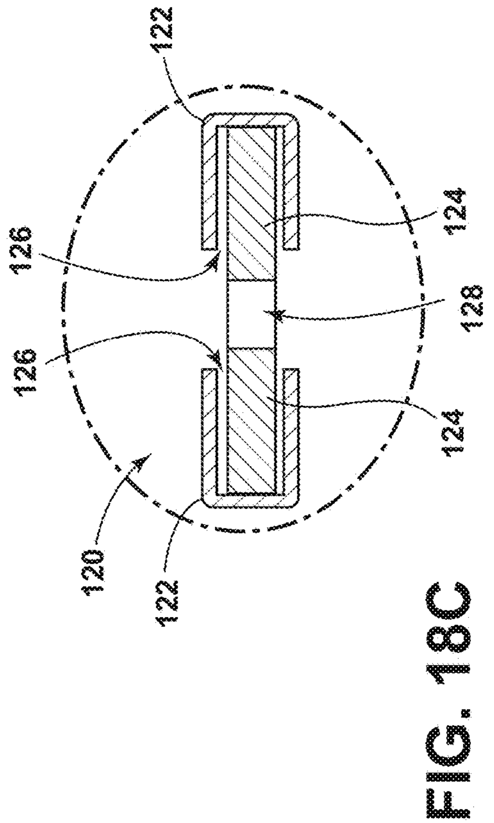

As shown best in FIGS. 18A-18C, microwave oven system 10 may include a multi-positionable bolt 120 for attaching microwave oven system 10 to the cabinetry. More specifically, in accordance with one embodiment, spaced rotatable mounts 122 slidably support a mounting element 124 having a threaded aperture 126. Mount 122 may be fastened to the outer wrapper 80 via a central fastener 128. With this arrangement, the mount 122 can rotate about the central fastener 128 to reposition threaded aperture 126 in different circumferentially spaced locations. In addition, the mounting element 124 can slide radially, along a length of rotatable mounts 122, to establish a mounting hole array.

As shown in FIGS. 18B and 18C, each of rotatable mounts 122 form a C-channel and/or aperture 126 that may be pivotablly mounted to the outer wrapper 80, or to another location on the external enclosure of microwave oven system 10, to establish mounting flexibility. In at least one case, each multi-positionable bolt 120 may be mounted at opposite corners of a top portion 12 of outer wrapper 80. The mounting element 124 is positioned within the C-channel and/or aperture 126, and may slide within the C-channel and/or aperture 126 and accept a threaded fastener (not shown) for vertically securing the overall microwave oven system 10 to an upper cabinetry, such as central cabinetry 114. The rotatable mounts 122, as well as the associated C-channel and/or aperture 126, may rotate about pivotable central fastener 128. Accordingly, in accordance with the illustrated embodiment, the sliding of mounting element 124, in addition to the rotation of rotatable mounts 122, allows the mounting element 124 to be positioned in a radial area defined by rotation around a pivot attachment, or central fastener 128. In addition, the C-channel and/or aperture length is at least greater in length than the radius defined for the mounting feature.

It will be understood that the mounting system of FIGS. 18A-18C is designed to fit different mounting hole positions in an upper cabinetry, and those skilled in the art will recognize alternative configurations beyond the specific illustrated embodiment. For example, a mechanical feature, such as a nut, a short pin, or other upward-projecting feature, could also be employed to facilitate automatic aligning of an existing cabinetry hole with the mounting system.

Figure 19B:
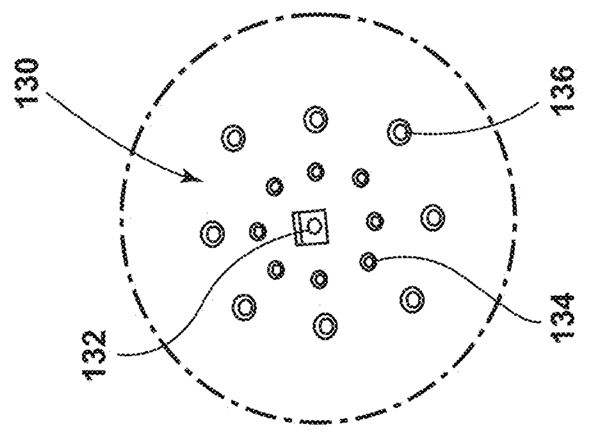
Figure 19A:
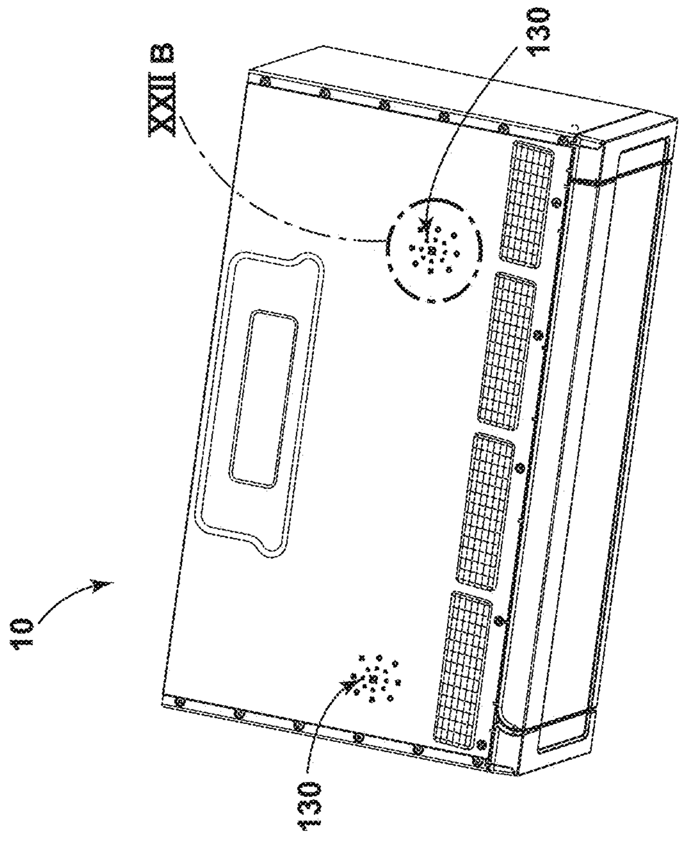

FIGS. 19A and 19B depict another embodiment for mounting microwave oven system 10. Specifically, a mounting hole array 130 may be provided, at two spaced locations, having a plurality of sets of radially spaced and circumferentially arranged holes. In at least one case, as shown in the illustrated embodiment of FIGS. 19A and 19B, mounting hole array includes a central threaded aperture 132, an inner circular aperture row 134 and an outer circular aperture row 136. Central threaded aperture 132, inner circular aperture row 134 and outer circular aperture row 136 may be formed on a top portion 12 of outer wrapper 80 of microwave oven system 10. The threaded apertures of mounting hole array 130 may be configured to accept mechanical fasteners (not shown) for vertically securing the combined ventilation hood and microwave oven system 10 to an upper central cabinetry 114. Again, as would be understood by a skilled artisan, the illustrated embodiment represents only one configuration of a mounting hole array system disclosed herein, and the configuration may be adjusted to enhance the ability to align mechanical fasteners for mounting a microwave oven system 10. For example, the mounting hole pattern may be larger or smaller, or may be arranged in a different pattern, such as rectangular, star, or other pattern contemplated by a skilled artisan.

Modular Heating System

In accordance with further aspects of the disclosure as represented in FIGS. 23-29, modular components may be coupled with the combined ventilation hood and microwave oven system 10 to increase the functionality of the above-the-range space, and yet still maintain an overall vertical dimension of no larger than the vertical dimension of a conventional combination ventilation and microwave oven system. In some embodiments, additional heating or cooking components may be coupled with microwave oven system 10. In other cases, additional storage, lighting or ventilation may be coupled with microwave oven system 10 to enhance functionality of the above-the-range space. In at least one case, a modular heating system 150 may be coupled with the combined ventilation hood and microwave oven system 10, as shown in the illustrated embodiment of FIGS. 23-27. Modular heating system 150 may provide a benefit often only found in a commercial kitchen where food is placed in a warmer until an entire meal is ready to be served. Additionally, modular heating system 150 may incorporate not only a radiant-heat warming cavity, but also a broiler element. Thus, the embodiment may enable a consumer to fit three or more complementary features, i.e., microwave oven, ventilation hood and a heating cavity into an area where only two features, i.e., ventilation hood and microwave oven, have conventionally been provided.

Figure 25:
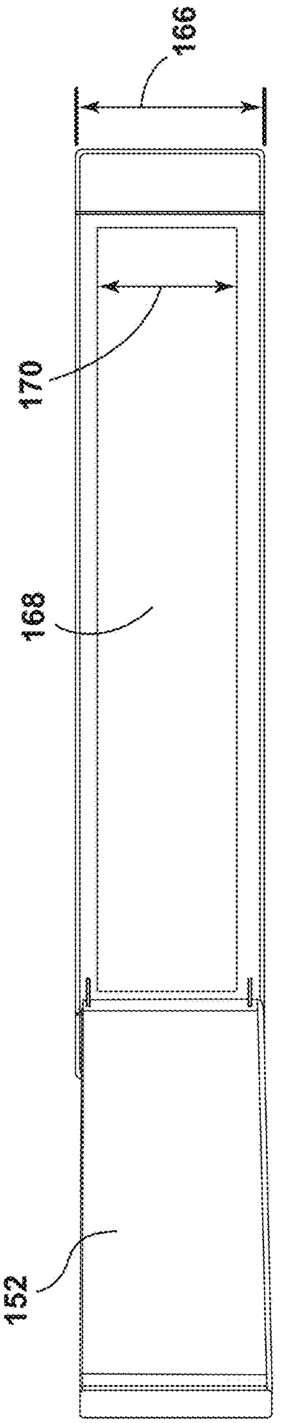
FIG. 25 is a front elevation view of portions of the combined ventilation hood and microwave oven system according to another embodiment of the present disclosure.
Figure 26:
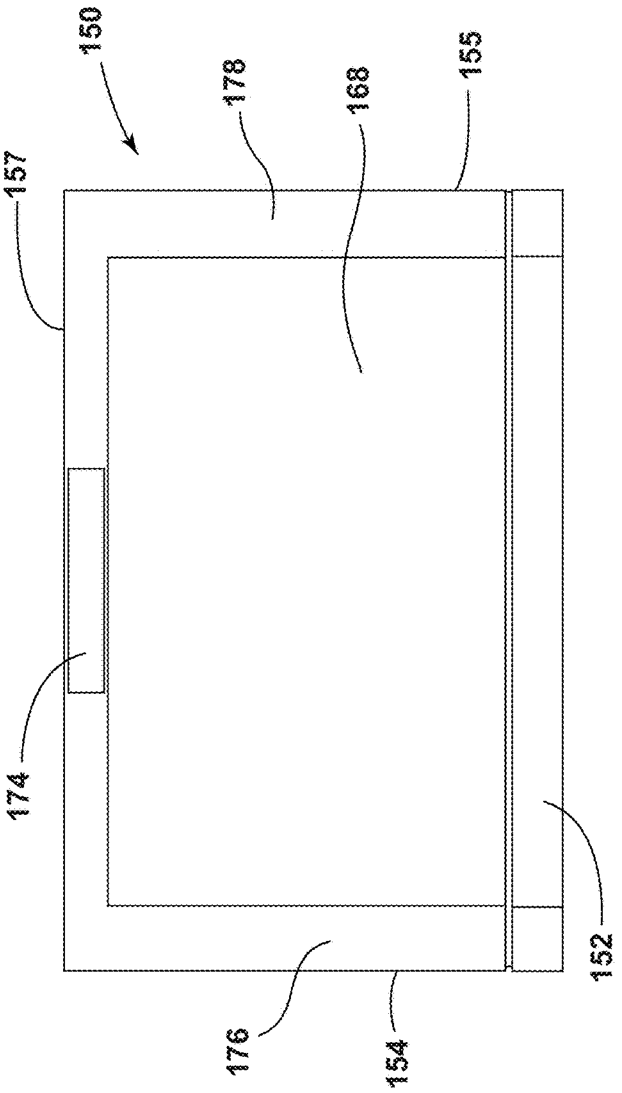
FIG. 26 is a top plan of portions of the combined ventilation hood and microwave oven system according to another embodiment of the present disclosure.
Figure 27:
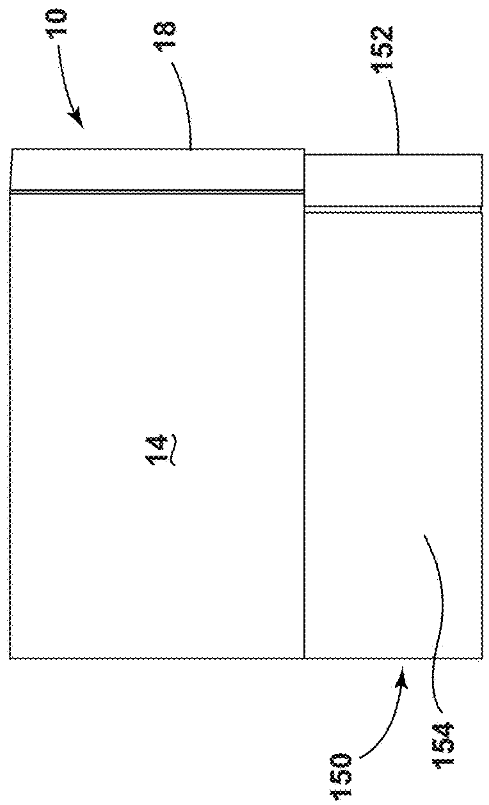
FIG. 27 is a side elevation view of the combined ventilation hood and microwave oven system according to another embodiment of the present disclosure.

FIGS. 23-27 depict various views of modular heating system 150 according to the illustrated embodiment disclosed herein. In the illustrated embodiment, heating system 150 includes an external enclosure including a door for accessing a heating cavity 168, a left side surface 154, a right side surface 155, a bottom surface 156 and a rear surface 157. As described in more detail below, bottom surface 156 of heating system 150 may serve as the bottom of a combined modular microwave oven system and thus bottom surface 156 may include a right vent inlet 160 and a left vent inlet 158, for receiving contaminated exhaust air 162, and one or more lights 165. Referring to FIG. 26, heating system 150 may further define a right vent channel 178 between right side surface 155 and heating cavity 152, aligning with right vent inlet 160 and for passing contaminated exhaust air 162 entering through right vent inlet 160 into microwave oven system 10. Likewise, heating system 150 may also define a left vent channel 176 between left side surface 154 and heating cavity 152, aligning with left vent inlet 158 and for passing contaminated exhaust air 162 entering through left vent inlet 158 into microwave oven system 10.

Heating system 150 includes a conventional heating component 174 coupled with heating cavity 168 and configured to provide heat to heating cavity 168. In some cases, conventional heating component 174 provides radiant heat, providing a steady and continuous heat for keeping food warm. In other cases, heating component may provide a broiling function to heating cavity 168, to further extend and enhance the functionality of heating system 150. However, it should be understood that the variety of types and methods of heating provided to heating cavity 168 are not limited as described herein, and a skilled artisan will recognize the variety of methods and configurations for providing heat within heating system 150 and to heating cavity 168.

According to an additional aspect of the illustrated embodiment, shown in FIG. 25, heating system 150 includes an overall vertical dimension 166 of less than about 200 mm and heating cavity 168 includes an internal vertical dimension 170 of less than about 150 mm. With this construction, an overall height and width of the microwave oven system 10 and the heating system 150, together, may be commensurate with a conventional microwave and ventilation hood system currently available in the market (represented in FIGS. 31 and 32B). In at least one case, heating system 150 includes an overall vertical dimension of about 177 mm and heating cavity 168 includes an internal vertical dimension of about 127 mm. Further, microwave oven system 10 may include an overall vertical dimension 30 of less than about 265 mm or about 262 mm. Accordingly, in at least one embodiment, the combination of microwave oven system 10 and heating system 150 may include an overall vertical dimension 167 that is equal to or less than about 440 mm, and in at least one case, about 389 mm.

Figure 28:
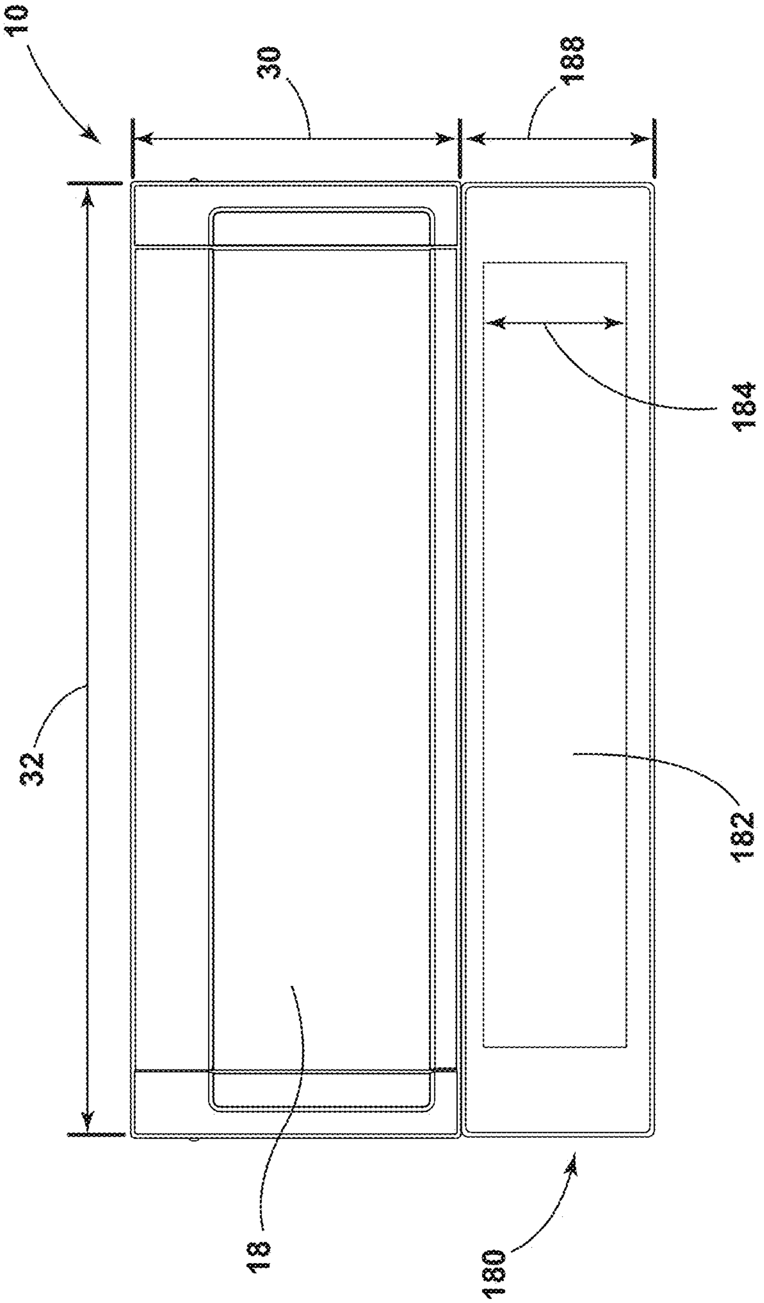
FIG. 28 is a front elevation view of a combined ventilation hood and microwave oven system according to yet another embodiment of the present disclosure.
Figure 29:
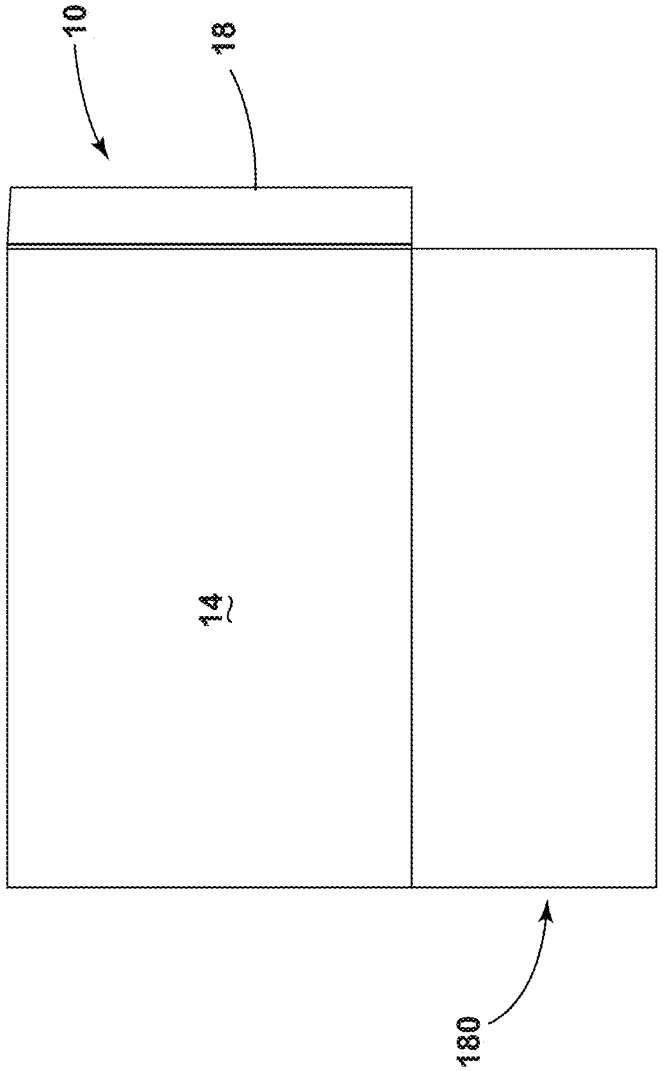
FIG. 29 is a side elevation view of the combined ventilation hood and microwave oven system according to another embodiment of the present disclosure.

FIGS. 28 and 29 depict another embodiment of a modular heating system, modular heating system 180, according to aspects disclosed herein. Heating system 180 has a similar structure as heating system 150, though in the additional embodiment of heating system 180, heating cavity 182 is not covered by a door such that there is direct access to heating cavity 182. In other words, similar to heating system 150, heating system 180 includes an external enclosure having a left side surface, a right side surface, a bottom surface, and a rear surface. Heating system 180 may also serve as the bottom of a combined modular microwave oven system and thus include a bottom surface similar to bottom surface 156.

Heating system 180 may also include a conventional heating component, similar to heating component 174, coupled with heating cavity 182 and configured to provide heat to heating cavity 182. In some cases, conventional heating component 174 provides radiant heat, providing a steady and continuous heat for keeping food warm. However, it should be understood that the variety of types and methods of heating provided to heating cavity 182 is not limited as described herein, and a skilled artisan will recognize the variety of methods and configurations for providing heat within heating system 180 and to heating cavity 182.

According to an additional aspect of the illustrated embodiment, shown in FIG. 28, the embodiment of heating system 180 includes an overall vertical dimension 188 of less than about 200 mm, and heating cavity 182 includes an internal vertical dimension 184 of less than about 150 mm. With this construction, an overall height and width of the microwave oven system 10 and the heating system 180, together, may be commensurate with a conventional microwave and ventilation hood system. Similar to the embodiment of heating system 150, heating system 180 may also include an overall vertical dimension of about 177 mm and heating cavity 182 may include an internal vertical dimension of about 127 mm.

Microwave Oven System with Dual Hood System

Figure 30:
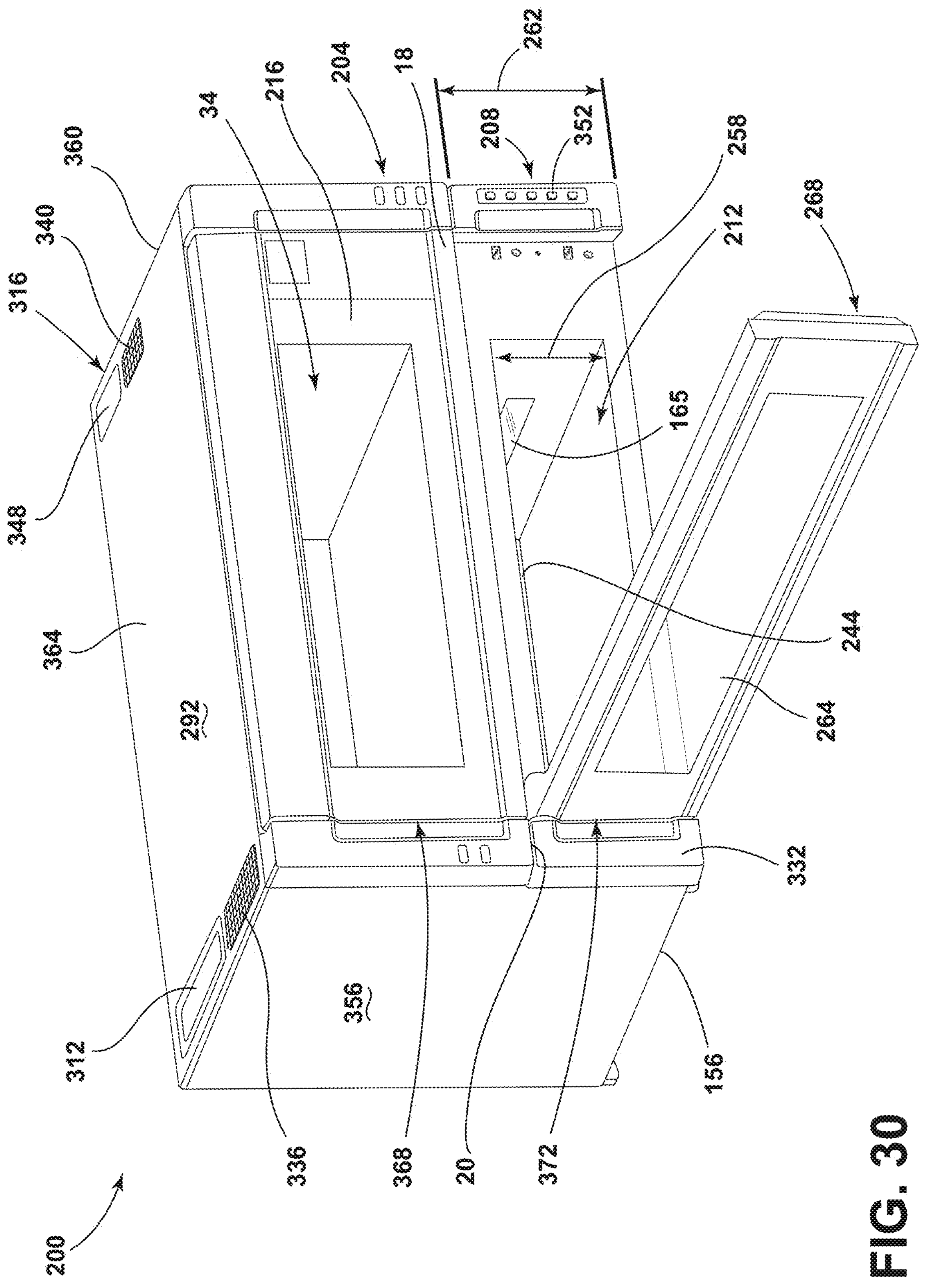
FIG. 30 is a side perspective view of a microwave hood system according to various embodiments of the present disclosure.

Referring to FIGS. 30-33, an additional exemplary embodiment is provided. Referring now to FIG. 30, a microwave hood system 200 can include both a microwave oven system 204 and the heating system 208. The microwave oven system 204 and the heating system 208 may be alternate exemplary embodiments of the microwave oven system 10 and the heating systems 150, 180, respectively. The microwave oven enclosure 216 may define the cooking cavity 34 therein. The cooking component 64 may be positioned within the cooking cavity 34 and configured to emit microwaves. The microwave oven enclosure 216 can further include the door 18. The microwave oven system 204 can include the heating system 208 coupled to the microwave oven enclosure 216. In various examples, the heating system 208 may be coupled to the bottom surface 20 of the microwave oven enclosure 216. In such examples, the heating system 208 can be for example, coupled via fasteners, snaps, welding, and/or adhesives.

The heating system 208 can define the heating cavity 212 therein. The heating cavity 212 may be an additional exemplary embodiment of the heating cavities 152, 168, 182. The cooking cavity 34 and the heating cavity 212 may operate independently such that a user may use either the cooking cavity 34 or the heating cavity 212 at a single time. In various examples, the heating cavity 212 and the cooking cavity 34 may operate simultaneously. In various examples, the heating cavity 212 may have an internal vertical dimension 258 of less than about 150 mm. In additional examples, the cooking cavity may have an overall vertical dimension 262 of less than about 200 mm. It will be contemplated that the overall vertical dimension 262 of the heating cavity may vary based on user preference and/or the overall vertical dimension of the microwave oven enclosure 216. It may be advantageous to have an overall vertical dimension 262 of the heating cavity 212 of less than about 200 mm and/or an internal vertical dimension 258 of less than about 150 mm so the combination of the microwave oven enclosure 216 and the heating system 208 can be a similar vertical dimension to conventional microwave oven systems.

Referring still to FIG. 30, the heating system 208 may further include a heating cavity door 264 which operates to enclose the heating cavity 212. The heating cavity door 264 may be configured to operate in a similar manner as the door 18 coupled to the microwave oven enclosure 216 (i.e., opens in a horizontal direction). In additional examples, the heating cavity door 264 may be configured to open vertically such that the user may utilize a door handle 268 to move the heating cavity door 264 in a downward and/or upward direction to an opened position. The door handle 268 may be defined by the heating cavity door 264.

The microwave hood system 200 can additionally include the light 165 coupled to the heating system 208. The light 165 may be coupled to the bottom surface 156 of the heating system 208 such that the light 165 can be directed to an appliance that may be positioned beneath the heating system 208 (i.e. a cooktop). In various examples, the light 165 may be positioned within the heating cavity 212. The light 165 may be operably coupled to a user-operated controller 352 such that the user may activate and deactivate the light 165. The light 165 may be, but is not limited to, fluorescent lighting, light emitting diodes (LEDs), organic LEDs (OLEDs), polymer LEDs (PLEDs), and/or solid-state lighting. In various examples, the light 165 may be configured to emit a wavelength of light in a range from about 380 nm to about 700 nm (i.e., visible light and/or white light) to take advantage of the relative low cost attribute to those types of LEDs.

Figure 31A:
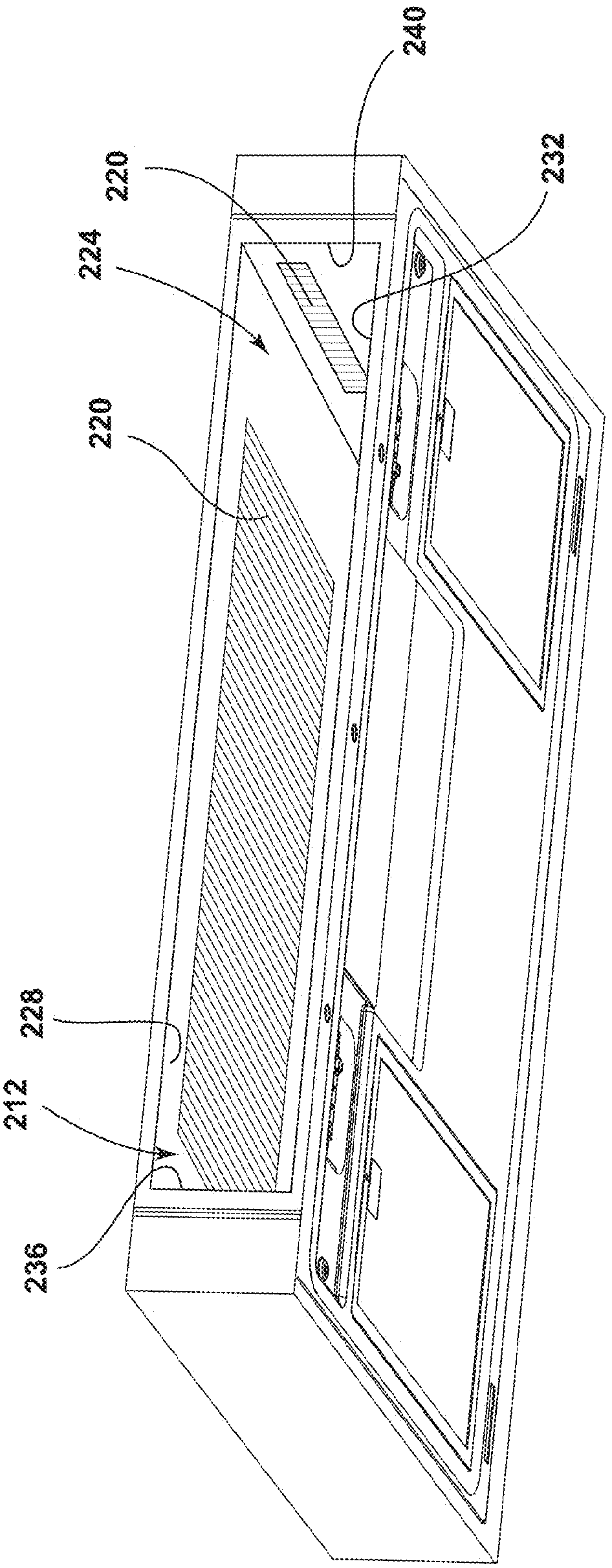
FIG. 31A is a bottom perspective view of a heating system of the microwave hood system according to various embodiments of the present disclosure.

Referring to FIG. 31A, the heating cavity 212 may have a heating element 220 positioned therein. The heating element 220 can be an additional exemplary embodiment of the heating component 174. The heating element 220 may provide radiant heat to the heating cavity 212. In such examples the heating element 220 operates to warm food items positioned within the heating cavity 212. The heating element 220 can be configured to warm the heating cavity 212 to a temperature in a range from about 40° C. to about 80° C. In other words, the heating element 220 can be configured to warm the heating cavity 212 to a temperature in a range from about 40° C. to about 80° C. The heating element 220 may be coupled to an interior surface 224 of the heating cavity 212. In various examples, the heating element 220 may be coupled to a top interior surface 228 of the heating cavity 212 and/or a bottom interior surface 232 of the heating cavity 212. In additional examples, the heating element 220 may be coupled to at least one of the top interior surface 228, the bottom interior surface 232, left or right side interior surfaces 236, 240, and a rear interior surface 244 (FIG. 30) of the heating cavity 212. It may be advantageous to have the heating element 220 coupled to each interior surface 224 of the heating cavity 212 to provide for uniform heating of food items within the heating cavity 212. In various examples, the heating element 220 may be configured to toast food items within the heating cavity 212. In such examples, the heating element 220 may be positioned on opposing interior surfaces 224 (i.e., left and right side interior surfaces 236, 240 or top and bottom interior surfaces 228, 232). The heating element 220 may be, for example, a metal tube, a quartz tube, a halogen tube, and/or a metal wire. The heating element 220 can be positioned within a designated area on the interior surface 224 or may extend in a pattern across the interior surface 224 (i.e., stripes, serpentine, etc.). The heating cavity 212 may include more than one type of heating element 220 that may be configured to perform the same and/or different functions.

Figure 31B:
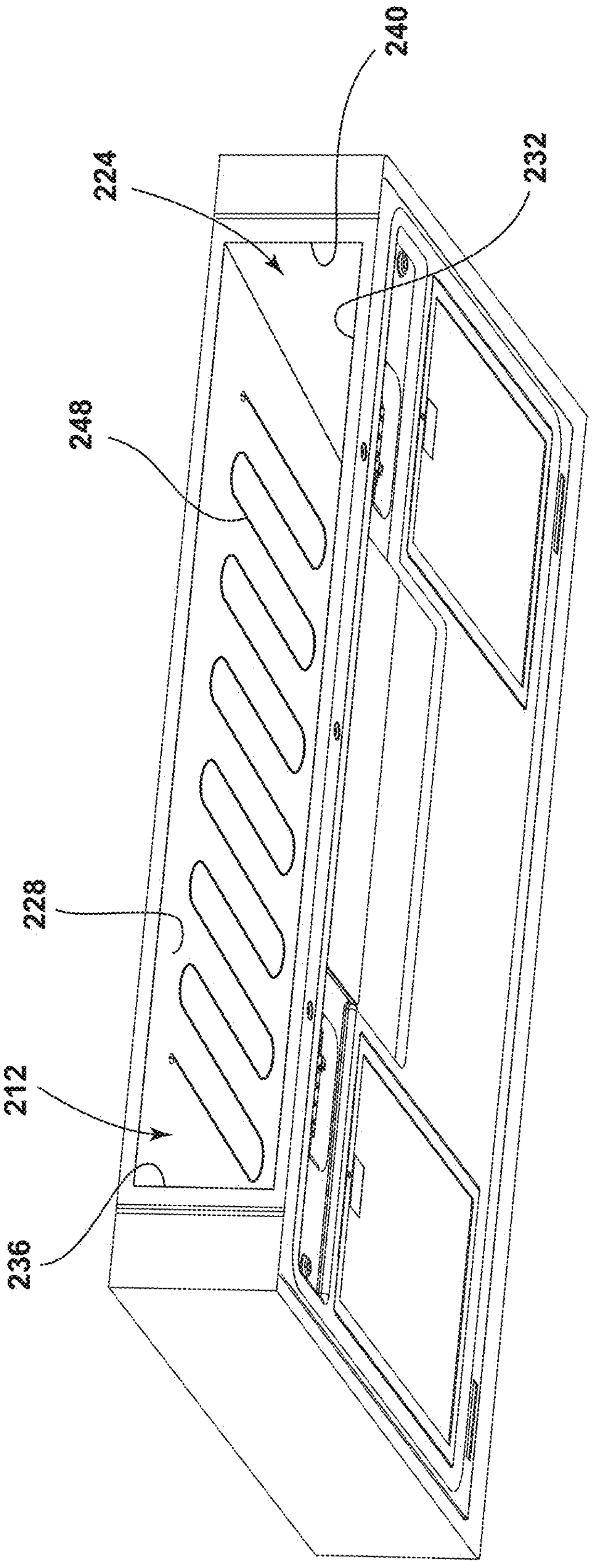
FIG. 31B a bottom perspective view of the heating system of the microwave hood system according to various embodiments of the present disclosure.

Referring to FIG. 31B, the heating cavity 212 may include a broiler element 248 positioned therein. The heating cavity 212 may include the broiler element 248 in addition to the heating element 220 (FIG. 31A). When the broiler element 248 is in use, the heating cavity 212 can reach a temperature in a range from about 150° C. to about 300° C. In other words, the heating cavity 212 may be configured to withstand cooking temperatures in a range from about 150° C. to about 300° C. The broiler element 248 may be coupled to the interior surface 224 of the heating cavity 212, similar to the heating element 220. In various examples, the broiler element 248 may be coupled to the top interior surface 228 of the heating cavity 212. In such examples, the broiler element 248 can arranged in a serpentine pattern across the top interior surface 228 of the heating cavity 212. The broiler element 248 may be, for example, metal wire, a metal tube, a quartz tube, and/or halogen tube.

Figure 31C:
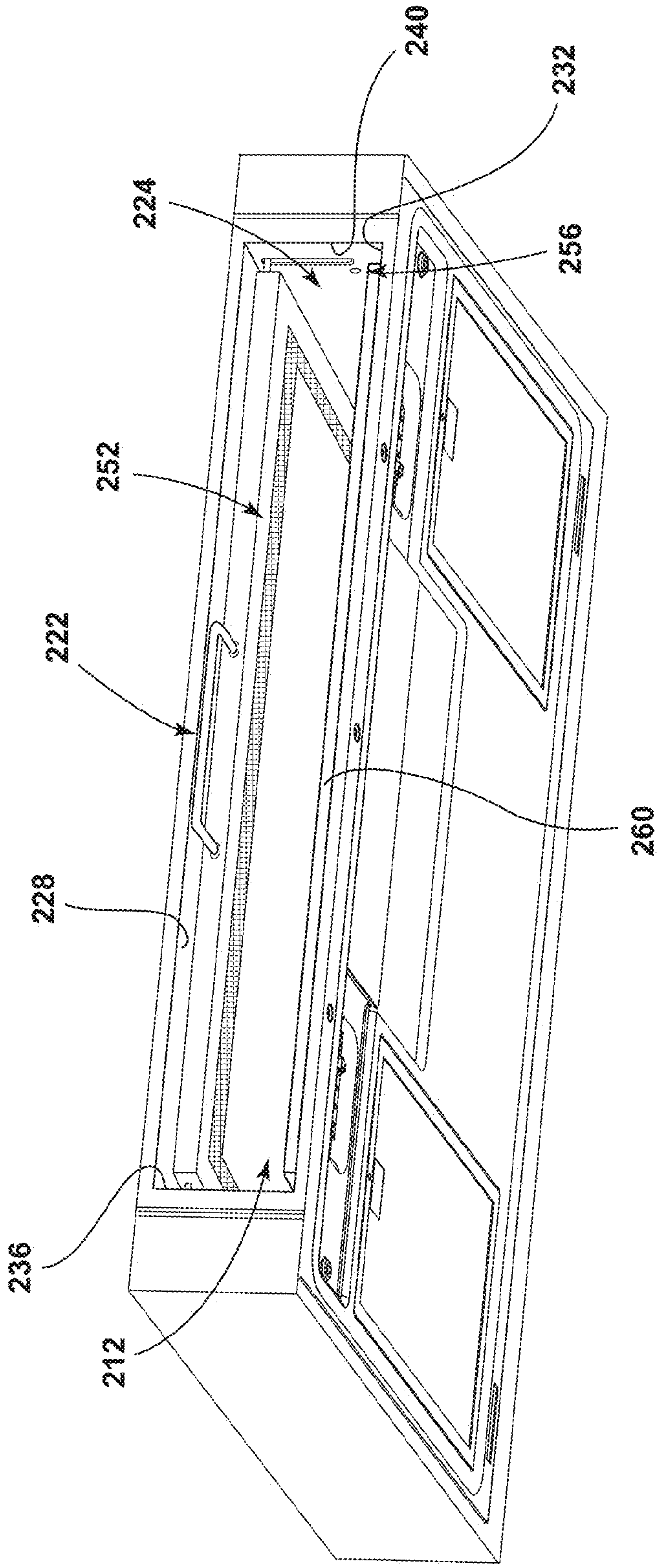
FIG. 31C a bottom perspective view of the heating system of the microwave hood system according to various embodiments of the present disclosure.

Referring to FIG. 31C, in various examples, a salamander cooking unit 252 may be positioned in the heating cavity 212. In such examples, the salamander cooking unit 252 can be coupled to the top interior surface 228 and/or the rear interior surface 244 (FIG. 30) of the heating cavity 212. The salamander cooking unit 252 may allow the user to broil, brown, caramelize, glaze, grill, and/or toast food items positioned within the heating cavity 212. It may be advantageous to include the salamander cooking unit 252 within the heating cavity 212 to provide a function to users that is typically found in commercial kitchens. The salamander cooking unit 252 may be configured to operate through a gas and/or electric heat source. In various examples, the salamander cooking unit 252 can utilize infrared ceramic broilers as a heating source. The salamander cooking unit 252 may be movably coupled to the interior surface 224 of the heating cavity 212 such that the salamander cooking unit 252 can be vertically adjusted within the heating cavity 212 via a handle 222 based on the food item positioned within the heating cavity 212. In such examples, the salamander cooking unit 252 may include more than one notch 256 defined by the left side, right side, and/or rear interior surfaces 236, 240, 244 (FIG. 30) of the heating cavity 212. The notch 256 may be configured to cooperate with a pan and/or grilling shelf 260. A user may manually adjust the vertical location of the pan and/or grilling shelves 260 to a desired position based on the location of the notch 256. The salamander cooking unit 252 can reach a cooking temperature in a range from about 150° C. to about 300° C. Availability of a salamander cooking unit 252 in the microwave oven system 204 may be advantageous to provide for quicker cooking times of food items due to the higher cooking temperatures of the salamander cooking unit 252. It may be further advantageous to provide users with the ability to finish cooking the top of food items in a lesser amount of time (i.e. melting cheese, caramelizing desserts). The heating cavity 212 may include the grilling shelf 260 within the salamander cooking unit 252 to provide users with a grilling function within the microwave hood system 200. In various examples, the microwave oven system may include an open-faced salamander cooking unit 252 which can provide quicker adding and removing of food into the heating cavity by user. It will be contemplated that the microwave oven system 204 can include a combination of the heating element 220 (FIG. 31A), the broiler element 248 (FIG. 31B), and/or the salamander cooking unit 252.

Figure 32A:
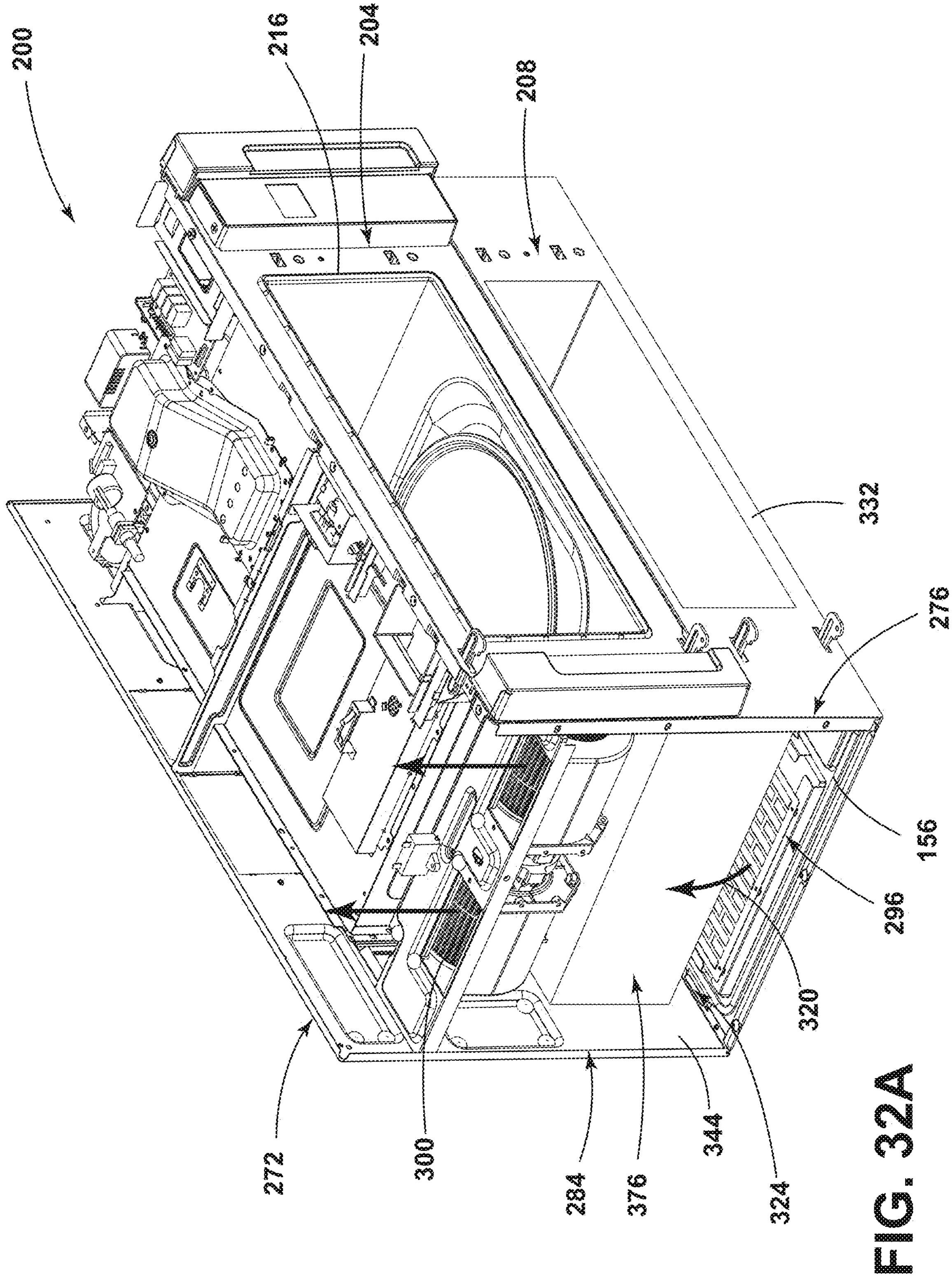
FIG. 32A is a side perspective view of the microwave hood system, with a portion of a housing removed, according to various embodiments of the present disclosure.
Figure 32B:
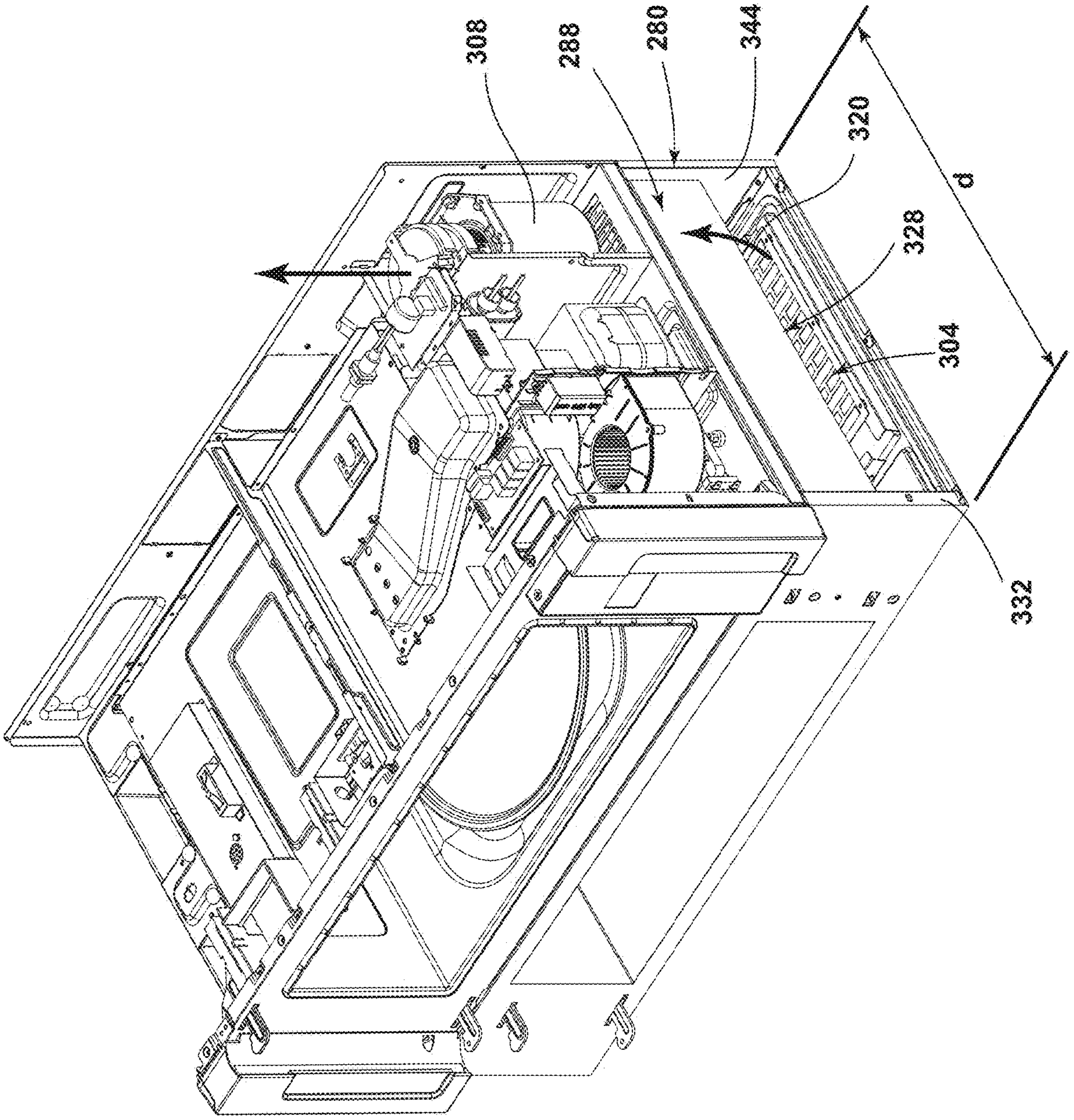
FIG. 32B a side perspective view of the microwave hood system, with a portion of the housing removed, according to various embodiments of the present disclosure.
Figure 32C:
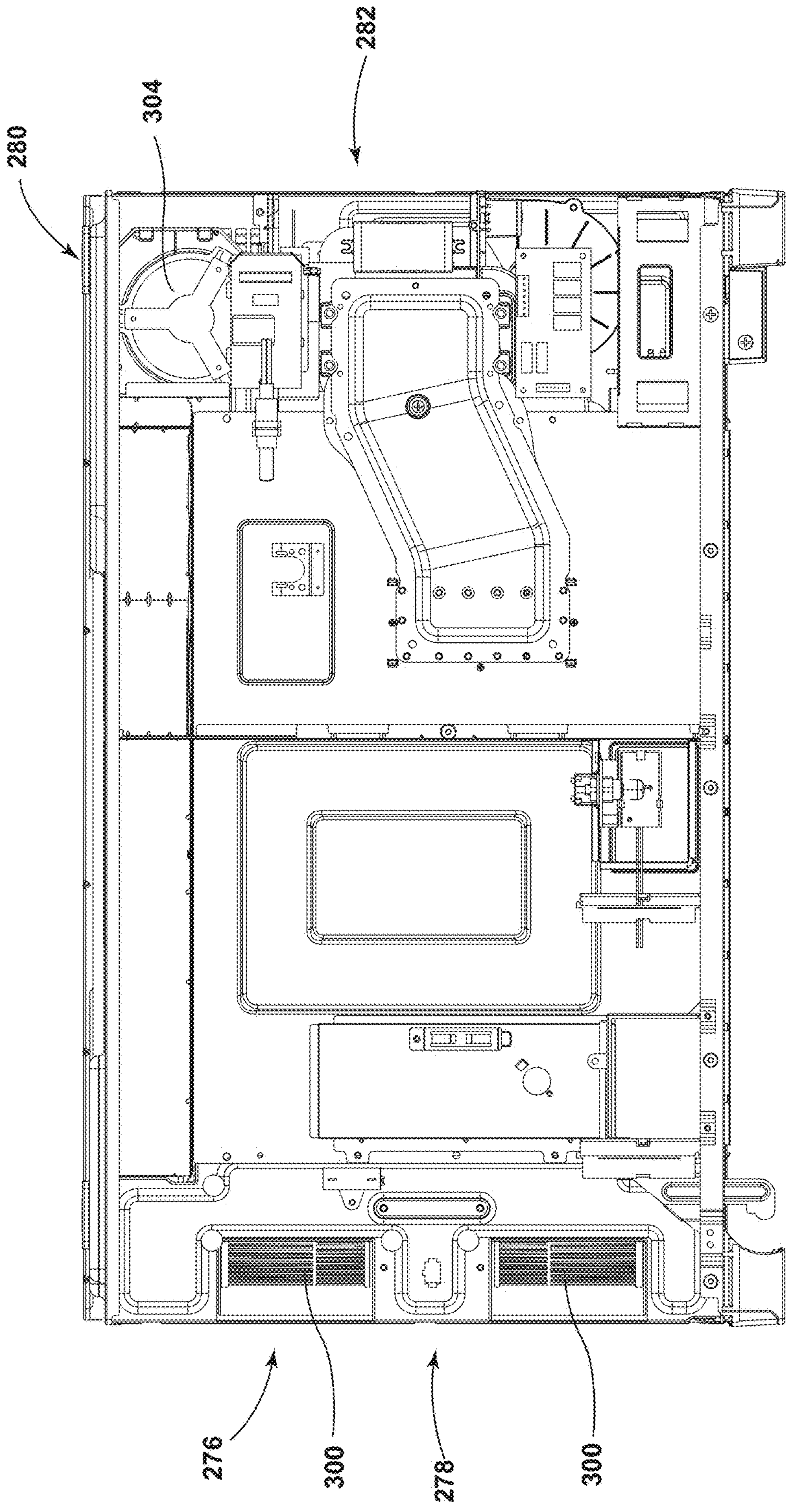
FIG. 32C is a top view of the microwave hood system with a top surface of the housing removed according to various embodiments of the present disclosure.

Referring to FIGS. 32A-C, the microwave hood system 200 may also include a dual hood system 272 coupled to the microwave oven system 204 and/or the heating system 208. The dual hood system 272 can include a first venting assembly 276 coupled to a left side 278 of microwave hood system 200 and a second venting assembly 280 coupled to a right side 282 of the microwave hood system 200. In other words, the first and second venting assemblies 276, 280 can be positioned on opposing sides 284, 288 of at least one of the microwave oven enclosure 216 and the heating system 208. The first and second venting assemblies 276, 280 may extend from the bottom surface 156 of the heating system to a top surface 292 (FIG. 30) of the microwave oven system 204. The bottom surface 156 of the heating system 208 can define a left vent inlet 296 positioned proximate a left vent fan 300 and a right vent inlet 304 positioned proximate a right vent fan 308. In a ventilation mode, the left and right vent fans 300, 308 may be configured to draw in air 320 from beneath the heating system 208 (i.e., a cooktop beneath the heating system 208) through the left and right vent inlets 296, 304. The air 320 may then travel through left and right vent channels 324, 328, respectively. The left and right vent channels 324, 328 may extend vertically upwards towards the top surface 292 (FIG. 30) of the microwave hood system 200. The top surface 292 of the microwave hood system 200 can define left and right outside vent outlets 312, 316 (FIG. 30) such that the air 320 traveling through the left and right vent channels 324, 328 may exit the dual hood system 272. The top surface 292 of the microwave oven enclosure 216 can also define left and right recirculation vent outlets 336, 340 (FIG. 30). In various examples, the left and right outside vent outlets 312, 316 may be used when the dual hood system 272 operates in a ventilation mode and the left and right recirculation vent outlets 336, 340 can be used in a recirculation mode.

At least one of the first and second venting assemblies 276, 280 may extend from a front surface 332 of the microwave hood system 200 to a rear surface 344 of the microwave hood system 200. In the depicted example, the first venting assembly 276 extends from the front surface 332 to the rear surface 344 of the microwave hood system 200, and the second venting assembly 280 extends from the rear surface 344 towards the front surface 332 for a portion of the depth d of the microwave hood system 200. In such examples, the second venting assembly 280 may not extend an entire depth d of the microwave hood system 200 due to the position of other microwave components (i.e., microwave emitter, transformer, etc.).

Referring still to FIGS. 32A-C, use of the dual hood system 272 on right and left sides 278, 280 of the microwave hood system 200 may be advantageous to allow for increased venting and/or recirculation of air 320. As previously explained in relation to the microwave oven system 10, the microwave hood system 200 may be configured to recirculate the air 320. In such examples, the dual hood system 272 may be configured to vent and/or recirculate air 320 at a rate in a range from about 450 cubic feet per minute to about 650 cubic feet per minute. Conventional microwave-hood combinations typically recirculate air at about 300 cubic feet per minute. It may therefore be advantageous to include the first and second venting assemblies 276, 280 as the inclusion of two venting assemblies and the lateral positions of the first and second venting assemblies 276, 280 can provide for approximately twice as much air 320 to be vented and/or recirculated per minute.

Referring again to FIGS. 30-32C, the dual hood system 272 may be configured to operate in the ventilation mode and/or the recirculation mode. The dual hood system 272 may be operably coupled to a user-operated controller 352 such that a user may select which mode the dual hood system 272 can operate at a designated time. In the recirculation mode, the air 320 can be drawn in through the left and right vent inlets 296, 304 and into the first and second venting assemblies 276, 280 respectively. Additionally, when operating in the recirculation mode, the left and right recirculation vent outlets 336, 340 may be covered to prevent the air 320 from exiting the dual hood system 272. The left and right recirculation vent outlets 336, 340 may be covered with an outlet cover 348 such that the air 320 is forced through the left and right outside vent outlets 312, 316. The outlet cover 348 may be positioned over the left and right recirculation vent outlets 336, 340 manually by the user. Additionally, the outlet cover 348 may be operably coupled to the user-operated controller 352 and configured to move over the left and right recirculation vent outlets 336, 340 when the microwave hood system 200 is in the ventilation mode.

With further reference to FIGS. 30-32C, in various embodiments, the outlet cover 348 can be positioned over the left and right outside vent outlets 312, 316 when the microwave hood system is in the recirculation mode. The outlet cover 348 may be positioned manually and/or via the user-operated controller 352. In the recirculation mode, the air 320 may move through the heating cavity 212 and/or the cooking cavity 34 and then through the left and right recirculation vent outlets 336, 340. The left and right recirculation vent outlets 336, 340 may be positioned on the top surface 292, left and right side surfaces 356, 360, or the front surface 332 of the microwave hood system 200. The covering of the left and right outside vent outlets 312, 316 may force the air 320 to exit the dual hood system 272 via left and right recirculation vent outlets 336, 340. In such examples, the air 320 that exits through the left and right recirculation vent outlets 336, 340 may be drawn in through the left and right vent inlets 296, 304 and continue to circulate through the dual hood system 272. It will be contemplated that the dual hood system 272 may be separated from the cooking cavity 34 and/or heating cavity 212. In such examples, the microwave oven system 204 may not include apertures to allow air 320 from the first and second venting assemblies 276, 280 to enter the cooking and/or heating cavities 34, 212. Accordingly, the dual hood system 272 may not include a recirculation mode.

The microwave hood system 200 may include a housing 364 surrounding the microwave oven enclosure 216 and the heating system 208. In other words, the microwave oven enclosure 216 and the heating system 208 may be positioned within the housing 364, providing for a more uniform aesthetic to the microwave oven system 204. In such examples, the housing 364 may include the front surface 332 defining at least two openings 368, 372 configured to correspond with the cooking cavity 34 and the heating cavity 212. The housing 364 can be made from, for example, metals, metal alloys, ceramics, and/or glass. It may be advantageous to include the housing 364 such that the microwave oven system 204 can have a seamless aesthetic. In examples with the housing, the first and second venting assemblies 276, 280 may be positioned between the housing 364 and the heating system 208 and microwave oven enclosure 216 on opposing sides 284, 288, respectively. In such examples, the left and right vent channels 324, 328 may be a space 376 between the housing 364, the microwave oven system 204, and the heating system 180. In examples without the housing 364, the first and second venting assemblies 276, 280 may be separate components coupled to opposing sides 284, 288 of the heating system 180 and microwave oven enclosure 216, respectively. In such examples, the dual hood system 272 may be divided into a top component coupled to the microwave oven enclosure 216 that is configured to correspond with a bottom component coupled to the heating system 208.

Figure 33:
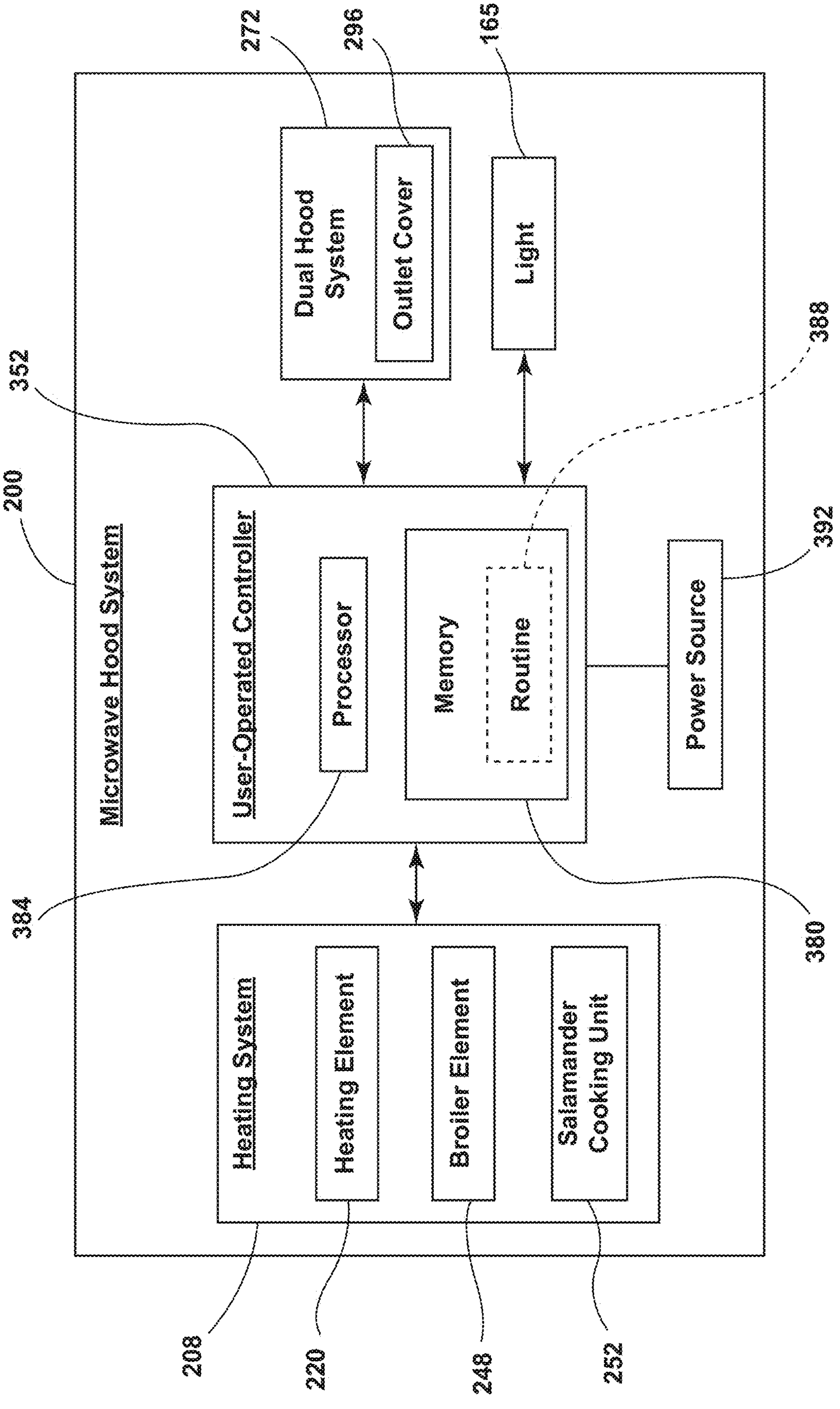
FIG. 33 is a schematic flow diagram of a controller of the microwave hood system according to various embodiments of the present disclosure.

Referring now to FIG. 33, the microwave hood system 200 can include the user-operated controller 352. In various examples, the user-operated controller 352 can include a memory 380 and a processor 384. The memory 380 may include a routine 388 for operation of the user-operated controller 352. The processor 384 may be coupled to the memory 380 and can be configured to execute routines 388 included in the memory 380. Additionally, the user-operated controller 352 can be coupled to a power source 392. In use, the user-operated controller 352 can allow a user to select a type of operation of the heating cavity 212 (i.e., warming, toasting, or broiling). The user-operated controller 352 may be operably coupled to the salamander cooking unit 252, the broiler element 248, and/or the heating element 220 such that the user may adjust the cooking temperature in and/or the cooking function of the heating system 208. The user-operated controller 352 may also allow for the user to selectively operate the heating element 220, broiler element 248, and/or salamander cooking unit 252 positioned in designated locations of the heating cavity 212. The user-operated controller 352 may be coupled to a front surface of the heating system 208 and/or the housing 364.

According to at least one aspect, a microwave hood system can include a microwave oven enclosure finding a cooking cavity therein. A cooking component may be positioned within the cooking cavity and configured to emit microwaves. The heating system may define a heating cavity therein. The heating system can be coupled to the microwave oven enclosure. The heating element may be positioned in the heating cavity. The heating cavity can reach a temperature in a range from about 40° C. to about 80° C. when the heating element is in use. A broiler element may be positioned within the heating cavity. The heating cavity can reach a temperature in a range from about 150° C. to about 300° C. when the broiler element is in use. A dual hood system may be coupled to the microwave hood system.

According to another aspect, the dual hood system can include first and second venting assemblies. The first and second venting assemblies may be coupled to right and left sides of said microwave oven system, respectively.

According to another aspect, the dual hood system may extend from a bottom surface of the heating system to a top surface of the microwave oven enclosure.

According to yet another aspect, at least one of the first and second venting assemblies can extend from a front surface of said microwave oven system to a rear surface of said microwave oven system.

According to another aspect, the heating cavity can have an internal vertical dimension of less than 150 mm.

According to still another aspect, a door may be coupled to the heating system.

According to at least one aspect, a microwave hood system can include a microwave oven enclosure defining a cooking cavity. A heating system may be coupled to the microwave oven enclosure. The heating system can define a heating cavity configured to withstand cooking temperatures in a range from about 150° C. to about 300° C. A salamander cooking unit may be positioned in the heating cavity. A dual hood system may include first and second venting assemblies positioned on first and second opposing sides, respectively, of at least one of the microwave oven enclosure and the heating system.

In another aspect, the salamander unit can be coupled to a top surface of the heating cavity.

In another aspect, the cooking cavity and the heating cavity may operate simultaneously.

In still another aspect, the microwave hood system may include a vent fan positioned proximate a vent inlet. The vent inlet can be defined by a bottom surface of the heating system. The microwave hood system may also include a vent channel extending vertically from the bottom surface of the heating system to a top surface of the microwave oven enclosure. The top surface can define the vent outlet.

In another aspect, a housing may be positioned around the microwave oven enclosure and the heating system.

In yet another aspect, a light may be coupled to a bottom surface of the heating system.

In another aspect, the heating system can have an overall vertical dimension of less than 200 mm.

In at least one aspect, a microwave hood system can include a housing. A microwave oven enclosure may be positioned within the housing and can define a cooking cavity. A cooking component may be positioned in the cooking cavity and be configured to emit microwaves. A heating system may be positioned in the house and coupled to the microwave oven enclosure. The heating system can define a heating cavity having a broiler element positioned therein. A dual hood system can include first and second venting assemblies positioned within the housing on first and second opposing sides, respectively, of the microwave oven enclosure and the heating system. The dual hood system may recirculate air.

In another aspect, a heating element can be positioned within the heating cavity and configured to warm the heating cavity to a temperature in a range from about 40° C. to about 80° C.

In another aspect, the heating element can operate to toast food items positioned within the heating cavity.

In still another aspect, the heating cavity can reach a temperature in a range from about 150° C. to about 300° C. when the broiler element is in use.

In yet another aspect, the cooking cavity and the heating cavity can operate independently.

In another aspect, the dual hood system can be configured to recirculate air in a range of about 450 cubic feet per minute to about 650 cubic feet per minute.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A microwave oven, comprising:

an external enclosure including:
- a first side portion;
- a second side portion;
- a top portion extending from the first side portion to the second side portion;
- a bottom portion extending from the first side portion to the second side portion and including a bottom surface, corners of the bottom surface defining a horizontal plane;
- a rear portion extending from the first side portion to the second side portion; and
- a door;

an air filter disposed at the bottom surface, wherein a planar extent of the air filter is at or above the horizontal plane;

a cooking cavity located within the external enclosure, wherein the door is operable to enclose the cooking cavity;

a cooking component located inside the external enclosure and outside the cooking cavity;

at least one vent outlet;

at least one vent inlet located on the bottom surface of the external enclosure, wherein the air filter extends across the at least one vent inlet;

at least one hood fan located inside the external enclosure, wherein the at least one hood fan is configured to:
- draw ventilation air through the at least one vent inlet from an area below the external enclosure; and
- expel the ventilation air through the at least one vent outlet;

a cooling air inlet;

a cooling air outlet in fluid communication with the cooling air inlet; and a cooling fan in fluid communication with the cooling air inlet and the cooling air outlet, wherein each of the cooling fan, the at least one hood fan, and the cooking component is located between at least one vertical surface of the external enclosure and the cooking cavity, and wherein each of the cooling fan, the at least one hood fan, and the cooking component is located above the air filter and below each of the cooling air outlet and the at least one vent outlet.

2. The microwave oven of claim 1, wherein the at least one vertical surface includes a first vertical surface, and wherein the first vertical surface is defined by an interior surface of one of the first side portion, the second side portion, and the rear portion of the external enclosure.

3. The microwave oven of claim 2, wherein the at least one hood fan is located between the first vertical surface and a second vertical surface, the second vertical surface being defined by a side wall of the cooking cavity.

4. The microwave oven of claim 2, wherein the at least one hood fan is located between the first vertical surface and a second vertical surface, and wherein the second vertical surface is defined by a rear wall of the cooking cavity.

5. The microwave oven of claim 1, wherein the at least one hood fan is configured direct the ventilation air in a vertical direction as the ventilation air flows away from the at least one hood fan and in a horizontal direction as the ventilation air flows above the cooking cavity towards the at least one vent outlet.

6. The microwave oven of claim 1, wherein the at least one hood fan includes a first hood fan and a second hood fan, wherein the first hood fan is located adjacent to the first side portion, and wherein the second hood fan is located adjacent to the rear portion.

7. The microwave oven of claim 1, wherein a distance from the top portion to the at least one hood fan is larger than a distance from the top portion to a top of the cooking cavity.

8. The microwave oven of claim 1, wherein a fan motor powering the at least one hood fan is located vertically below a plane defined by a top of the cooking cavity.

9. The microwave oven of claim 1, wherein the cooling air outlet is adjacent to a forward edge of a top surface of the top portion, and wherein the at least one vent outlet is located between the cooling air inlet and the cooling air outlet.

10. The microwave oven of claim 1, wherein the cooling fan is located between a side wall of the cooking cavity and the first side portion.

11. The microwave oven of claim 1, wherein the cooling fan is configured to direct air in a first vertical direction through the cooling air inlet, through the cooking cavity, in a second vertical direction through a top of the cooking cavity, and in the second vertical direction through the cooling air outlet to be expelled from the external enclosure.

12. The microwave oven of claim 1, wherein the at least one vent outlet includes a first vent outlet and a second vent outlet.

13. The microwave oven of claim 12, wherein at least the first vent outlet is located between the cooling air inlet and the cooling air outlet.

14. The microwave oven of claim 12, wherein each of the first vent outlet and the second vent outlet are located between the cooling air inlet and the cooling air outlet.

15. The microwave oven of claim 14, where each of the first vent outlet, the second vent outlet, the cooling air inlet, and the cooling air outlet are aligned along a forward edge of the top portion.

16. The microwave oven of claim 1, wherein a top of the door is located adjacent to a forward edge of a top surface of the top portion when the door is in a closed position.

17. The microwave oven of claim 1, wherein the at least one vent inlet includes a first vent inlet and a second vent inlet.

18. The microwave oven of claim 1, wherein the at least one hood fan includes a first hood fan and a second hood fan.

19. The microwave oven of claim 18, wherein the first hood fan is located between the first side portion and a first side wall of the cooking cavity, and wherein the second hood fan is located between the second side portion and a second side wall of the cooking cavity.

20. The microwave oven of claim 1, wherein the at least one vent outlet is defined through the top portion proximate to a forward edge.

21. The microwave oven of claim 1, wherein the at least one vent outlet is defined through the top portion proximate to a rear edge.

22. The microwave oven of claim 1, wherein the cooling fan is located between the first side portion and a first side wall of the cooking cavity, and wherein the at least one hood fan includes a first hood fan located between the second side portion and a second side wall of the cooking cavity.

23. The microwave oven of claim 1, wherein the at least one hood fan is adjacent to the rear portion of the external enclosure and a rear surface of the cooking cavity.

24. The microwave oven of claim 1, wherein the at least one hood fan is located between a plane defined by the rear portion of the external enclosure and a plane defined by a rear surface of the cooking cavity.

25. The microwave oven of claim 1, wherein the external enclosure has a vertical dimension of less than about 300 mm.

26. The microwave oven of claim 25, wherein a vertical dimension of the cooking cavity is at least about 68% of the vertical dimension of the external enclosure.

27. The microwave oven of claim 26, wherein a depth of said microwave oven is greater than the vertical dimension of the external enclosure, wherein a volume of the cooking cavity is at least about 35% of a volume of the external enclosure.

28. The microwave oven of claim 1, further comprising:
- a cover, wherein the at least one vent outlet includes an outside vent outlet located adjacent to a rear edge of the top portion, and wherein the at least one hood fan is configured to expel the ventilation air through the outside vent outlet in an outside venting mode, and further wherein the cover is positioned over the outside vent outlet when in a recirculation mode.

29. The microwave oven of claim 1, wherein the cooling fan is configured to direct cooling air vertically into the external enclosure and expel the cooling air vertically from the external enclosure, and wherein the at least one hood fan is configured to direct the ventilation air vertically into the external enclosure and expel the ventilation air vertically from the external enclosure.

30. The microwave oven of claim 1, wherein the at least one hood fan and the cooling fan are disposed above a horizontal plane defined by a bottom of the cooking cavity.

31. A microwave oven, comprising:
- an external enclosure including:
  - a first side portion;
  - a second side portion;
  - a top portion extending from the first side portion to the second side portion;
  - a bottom portion extending from the first side portion to the second side portion and including a bottom surface, corners of the bottom surface defining a horizontal plane;
  - a rear portion extending from the first side portion to the second side portion; and
  - a door;
- an air filter disposed at the bottom surface, wherein a planar extent of the air filter is at or above and the horizontal plane;

a cooking cavity located within the external enclosure, wherein the door is operable to enclose the cooking cavity;

a cooking component located inside the external enclosure and outside the cooking cavity;

at least one vent outlet;

at least one vent inlet located on the bottom surface of the external enclosure, wherein the air filter extends across the at least one vent inlet;

at least one hood fan located inside the external enclosure, wherein the at least one hood fan is configured to:

draw ventilation air vertically through the at least one vent inlet from an area below the external enclosure; and expel the ventilation air vertically through the at least one vent outlet;

a cooling air inlet;

a cooling air outlet in fluid communication with the cooling air inlet; and a cooling fan in fluid communication with the cooling air inlet and the cooling air outlet, wherein each of the cooling fan, the at least one hood fan, and the cooking component is located between at least one vertical surface of the external enclosure and the cooking cavity, and wherein each of the cooling fan, the at least one hood fan, and the cooking component is located above the air filter and below the cooling air inlet.

* * * * *